United States Patent
Harper et al.

(10) Patent No.: US 9,355,663 B1
(45) Date of Patent: May 31, 2016

(54) MULTIPLE DEGREE OF FREEDOM ACTUATOR ASSEMBLIES HAVING FLEXURE BASED PIVOT FUNCTIONALITY

(71) Applicant: International Business Machines Corporation, Armonk, NY (US)

(72) Inventors: David H. F. Harper, Vail, AZ (US); Hugo E. Rothuizen, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/682,020

(22) Filed: Apr. 8, 2015

(51) Int. Cl.
G11B 5/55 (2006.01)
G11B 5/48 (2006.01)
G11B 5/584 (2006.01)

(52) U.S. Cl.
CPC ............ G11B 5/4873 (2013.01); G11B 5/4893 (2013.01); G11B 5/5504 (2013.01); G11B 5/584 (2013.01)

(58) Field of Classification Search
USPC .............. 360/261.1, 291, 77.12, 241.1, 241.3
See application file for complete search history.

(56) References Cited

U.S. PATENT DOCUMENTS

| | | | | |
|---|---|---|---|---|
| 5,377,052 A * | 12/1994 | Guzman et al. | ............ | 360/261.1 |
| 5,508,865 A * | 4/1996 | La Garcia et al. | ............ | 360/291 |
| 5,566,039 A * | 10/1996 | Spicer | ......................... | 360/261.1 |
| 5,680,278 A * | 10/1997 | Sawtelle, Jr. | ................. | 360/261 |
| 5,949,619 A * | 9/1999 | Eckberg et al. | ............... | 360/291 |
| 6,137,659 A | 10/2000 | Warmenhoven | | |
| 6,195,238 B1 * | 2/2001 | Yeakley et al. | ............ | 360/291.2 |
| 6,307,718 B1 * | 10/2001 | Kasetty | ....................... | 360/291.1 |
| 6,333,838 B1 * | 12/2001 | Anderson | .................. | 360/261.1 |
| 6,442,004 B1 | 8/2002 | Heinz | | |
| 7,248,443 B2 | 7/2007 | Kwon et al. | | |
| 7,359,160 B2 * | 4/2008 | Koga et al. | .................... | 360/291 |
| 7,649,710 B2 * | 1/2010 | Bui et al. | .................... | 360/77.12 |
| 8,027,121 B2 * | 9/2011 | Argumedo et al. | ........ | 360/77.12 |

(Continued)

FOREIGN PATENT DOCUMENTS

| | | |
|---|---|---|
| EP | 1202273 A2 | 5/2002 |
| EP | 1223664 A2 | 7/2002 |

(Continued)

OTHER PUBLICATIONS

Boettcher et al., "Dynamic Modeling and Control of a Piezo-Electric Dual-Stage Tape Servo Actuator," IEEE Transactions on Magnetics, vol. 45, No. 7, Jul. 2009, pp. 3017-3024.

(Continued)

*Primary Examiner* — Brian Miller
(74) *Attorney, Agent, or Firm* — Zilka-Kotab, PC

(57) ABSTRACT

An apparatus, according to one embodiment, includes: a head carriage assembly, a flexure coupling the head carriage assembly to a linear assembly, the linear assembly being configured to move along a fine motion direction, and a motor coupled to the head carriage assembly for rotatably positioning the head carriage assembly about an axis of skew which extends perpendicular to a plane defined by an intended direction of media movement across the head carriage assembly and the fine motion direction, the fine motion direction being oriented perpendicular to the intended direction of media movement. The flexure permits the rotatable positioning of the head carriage assembly about the axis of skew. Moreover, the flexure resists pitching movement of the head carriage assembly relative to the linear assembly.

19 Claims, 19 Drawing Sheets

(56) References Cited

U.S. PATENT DOCUMENTS

| | | | |
|---|---|---|---|
| 8,035,926 B2 * | 10/2011 | Harper | 360/261.1 |
| 9,251,821 B1 | 2/2016 | Harper et al. | |
| 2001/0017749 A1 | 8/2001 | Stefansky | |
| 2004/0070865 A1 | 4/2004 | Sri-Jayantha et al. | |
| 2004/0120078 A1 | 6/2004 | Berding et al. | |
| 2006/0103968 A1 * | 5/2006 | Jurneke | 360/76 |
| 2007/0171577 A1 | 7/2007 | Ycas | |
| 2011/0075527 A1 | 3/2011 | Hirata et al. | |
| 2011/0102937 A1 | 5/2011 | Argumedo et al. | |
| 2013/0170072 A1 | 7/2013 | Meyer | |

FOREIGN PATENT DOCUMENTS

| | | | |
|---|---|---|---|
| GB | 2467841 A | 8/2010 | |
| GB | 2501521 A | 10/2013 | |
| WO | 2007098277 A2 | 8/2007 | |

OTHER PUBLICATIONS

Notice of Allowance from U.S. Appl. No. 14/682,011, dated Sep. 21, 2015.

Harper et al., U.S. Appl. No. 14/682,011, filed Apr. 8, 2015.

Non-Final Office Action from U.S. Appl. No. 14/682,011, dated Jun. 1, 2015.

* cited by examiner

MULTIPLE DEGREE OF FREEDOM ACTUATOR ASSEMBLIES HAVING FLEXURE BASED PIVOT FUNCTIONALITY

BACKGROUND

The present invention relates to data storage systems, and more particularly, this invention relates to multiple degree of freedom actuator assemblies having pivot functionality enabled by the implementation of flexures.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. In a tape drive system, the drive moves the magnetic tape over the surface of the tape head at high speed. Moreover, read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

BRIEF SUMMARY

An apparatus, according to one embodiment, includes: a head carriage assembly, a flexure coupling the head carriage assembly to a linear assembly, the linear assembly being configured to move along a fine motion direction, and a motor coupled to the head carriage assembly for rotatably positioning the head carriage assembly about an axis of skew which extends perpendicular to a plane defined by an intended direction of media movement across the head carriage assembly and the fine motion direction, the fine motion direction being oriented perpendicular to the intended direction of media movement. The flexure permits the rotatable positioning of the head carriage assembly about the axis of skew. Moreover, the flexure resists pitching movement of the head carriage assembly relative to the linear assembly.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein.

Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes: a head carriage assembly, a flexure coupling the head carriage assembly to a linear assembly, the linear assembly being configured to move along a fine motion direction, and a motor coupled to the head carriage assembly for rotatably positioning the head carriage assembly about an axis of skew which extends perpendicular to a plane defined by an intended direction of media movement across the head carriage assembly and the fine motion direction, the fine motion direction being oriented perpendicular to the intended direction of media movement. According to the present general embodiment, the flexure permits the rotatable positioning of the head carriage assembly about the axis of skew. Moreover, the flexure resists pitching movement of the head carriage assembly relative to the linear assembly.

Figure 1A:
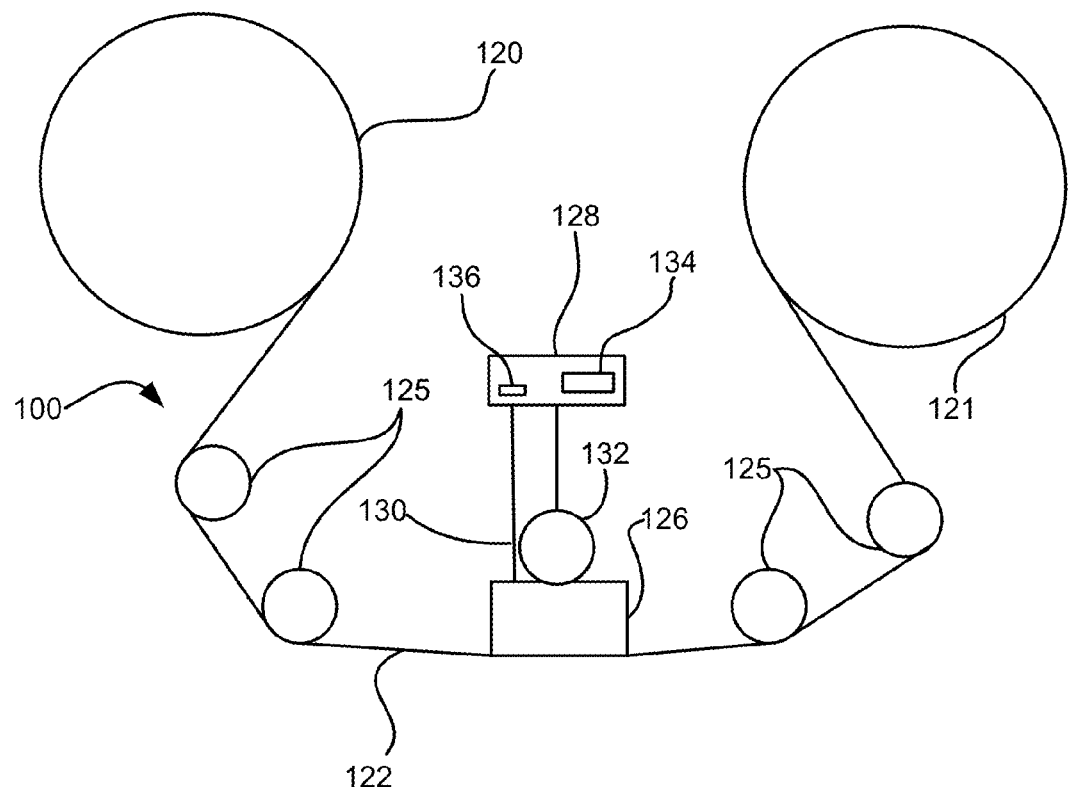
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits which transmit data to the head 126 to be recorded on the tape 122 and which receive data read by the head 126 from the tape 122. Moreover, an actuator assembly 132 controls a position of the head 126 relative to the tape 122. The actuator assembly 132 may include a coarse actuator, fine actuator, worm screw, springs, etc. depending on the desired embodiment. According to some exemplary embodiments, the actuator assembly 132 may include one or more components which enable multiple degrees of freedom for the head 126 relative to the tape 122, as will be described in further detail below, e.g., see FIGS. 8A and 12A.

Referring still to FIG. 1A, an interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
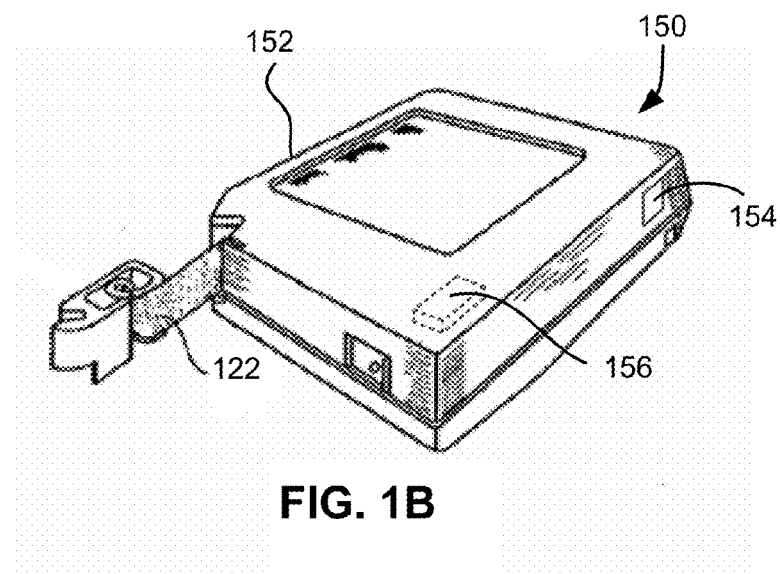
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
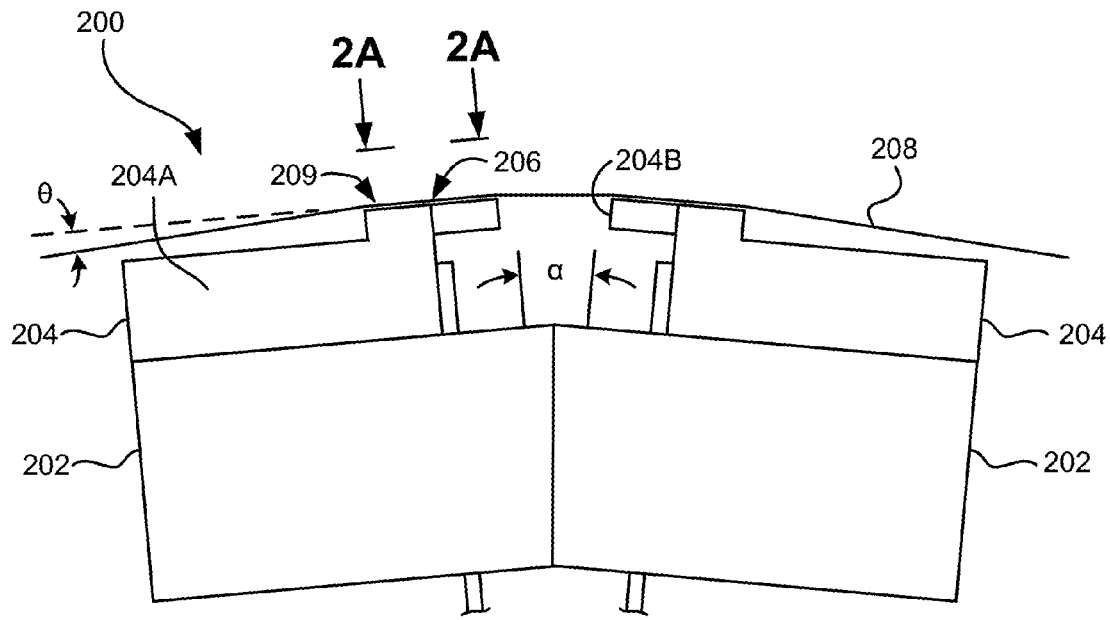
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
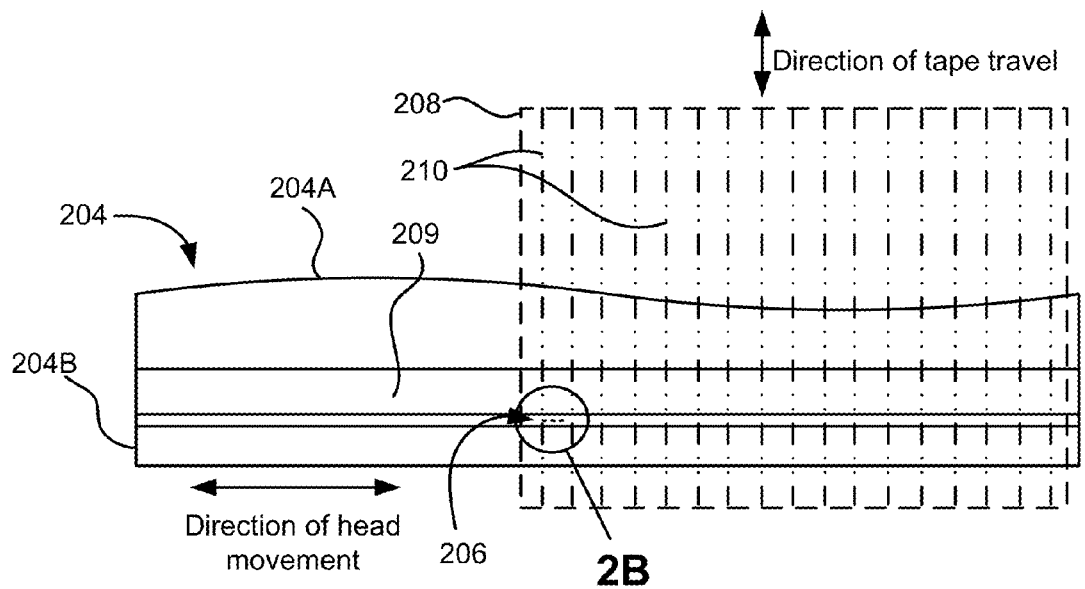
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
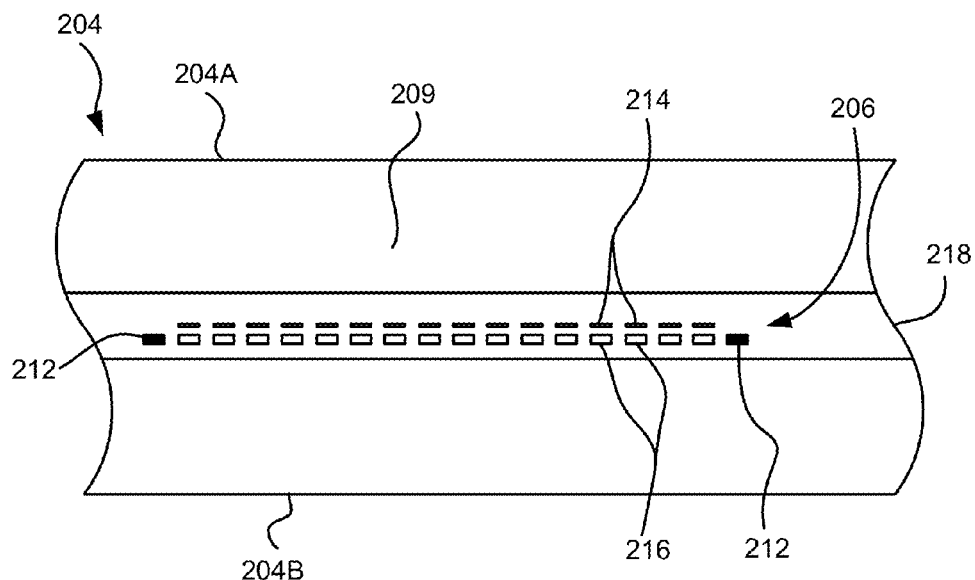
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
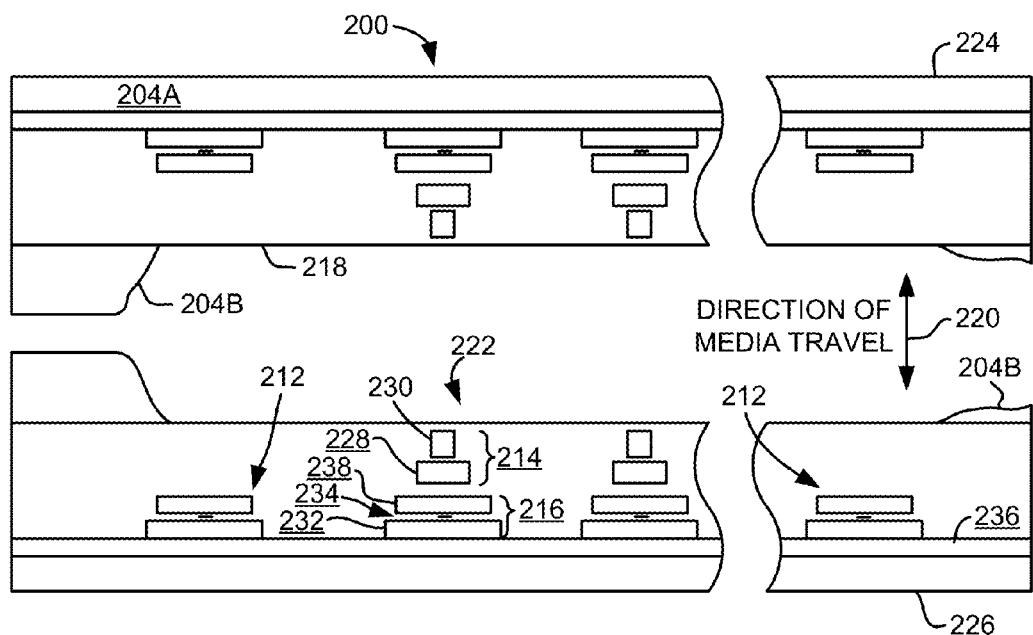
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of movement of a tape medium thereacross to form an R/W pair, exemplified by the R/W pair 222. Note that the intended direction of tape movement is also referred to herein as an "intended direction of tape travel" and sometimes referred to herein as the direction of tape travel; accordingly such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), CZT or Al—Fe—Si (Sendust), a sensor 234 for sensing a data track on a magnetic medium, a second shield 238 typically of a nickel-iron alloy (e.g., ~80/20 NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
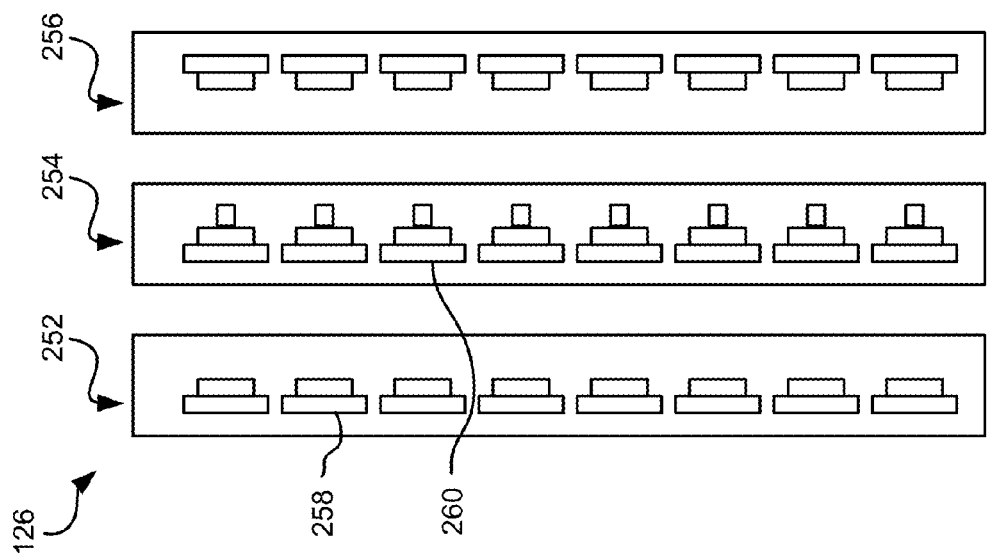
FIG. 4 is a partial tape bearing surface view of a magnetic head having a read-write-read configuration.
Figure 3:
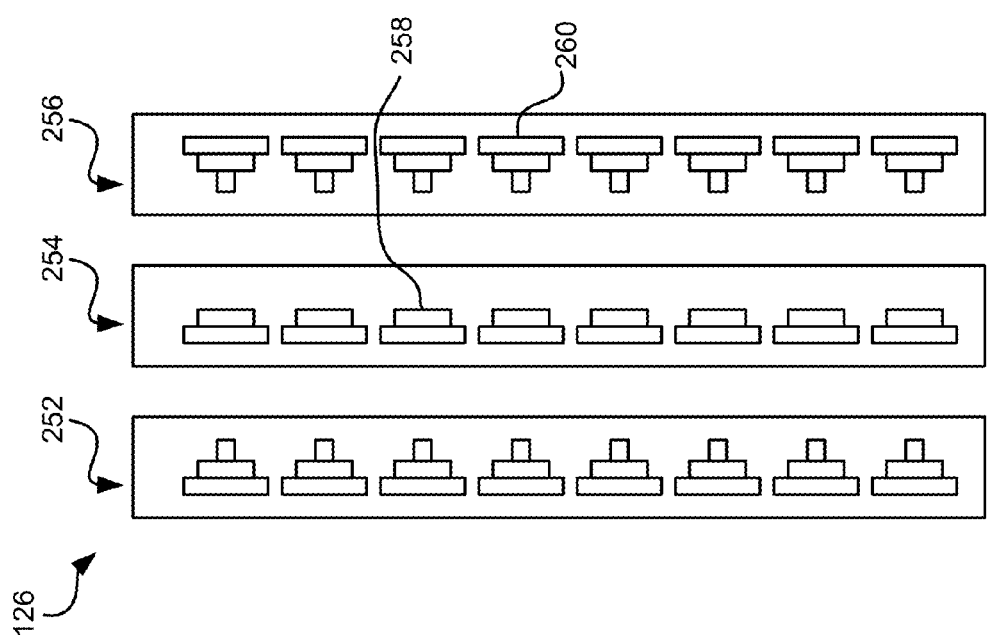
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
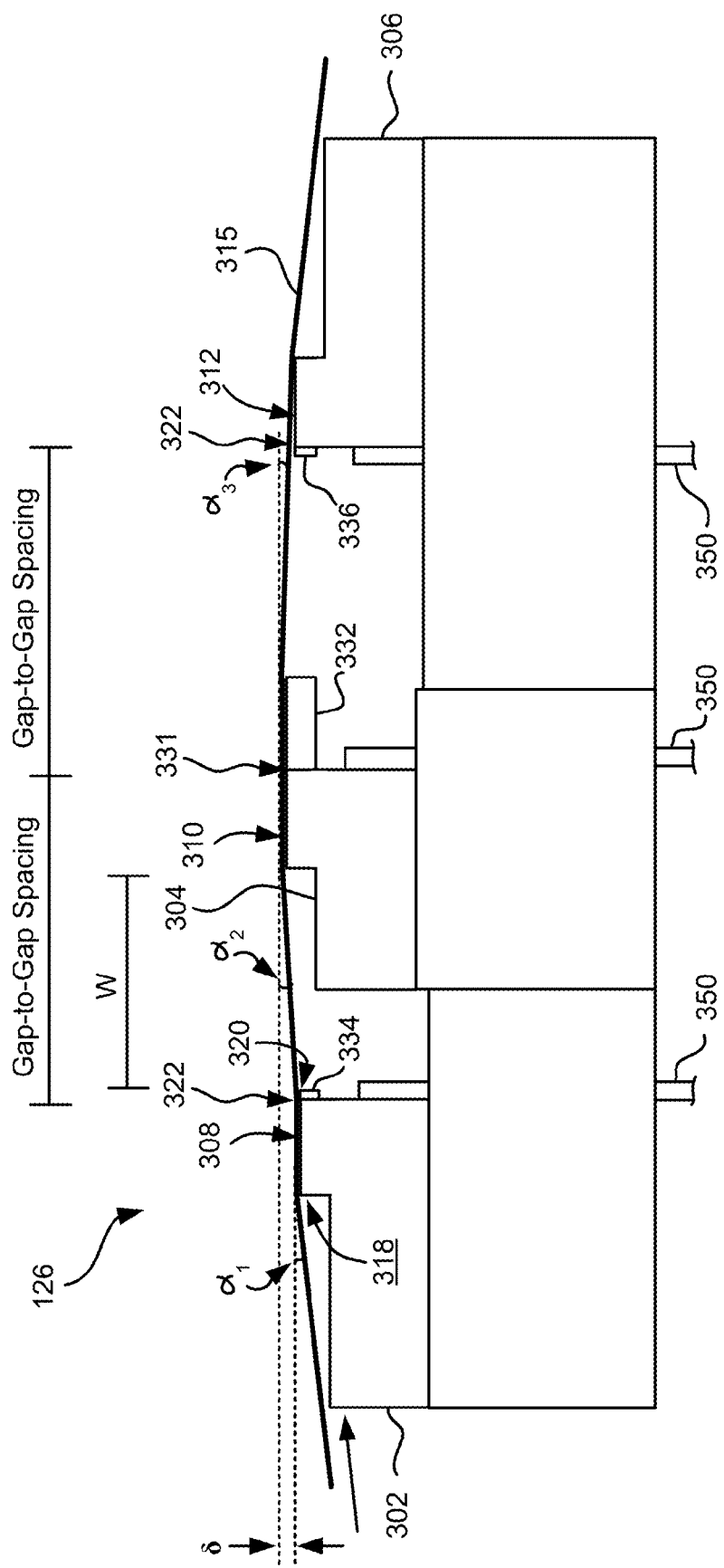
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
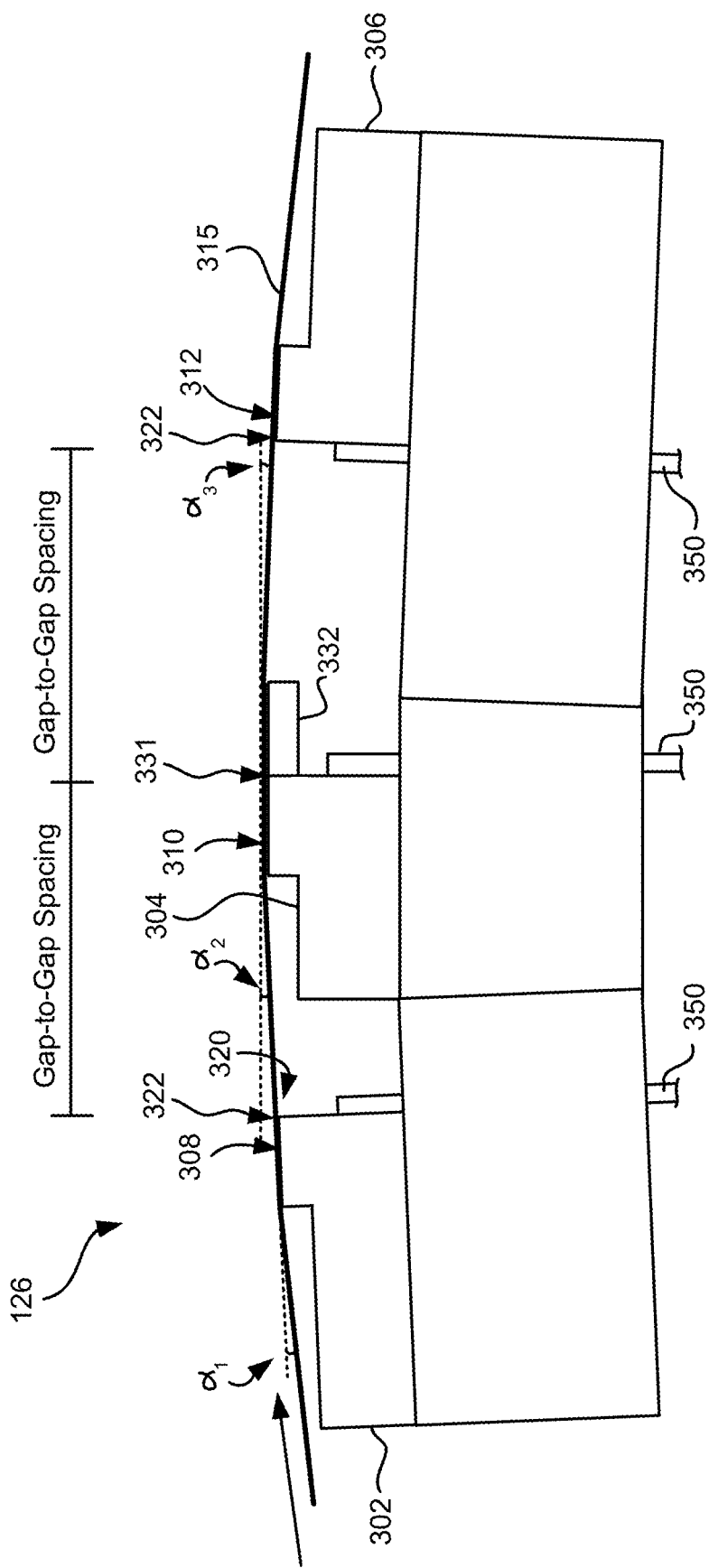
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for writeread-write applications. Additional aspects of these embodiments are similar to those given above.

Typically, the tape wrap angles may be set about midway between the embodiments shown in FIGS. 5 and 6.

Figure 7:
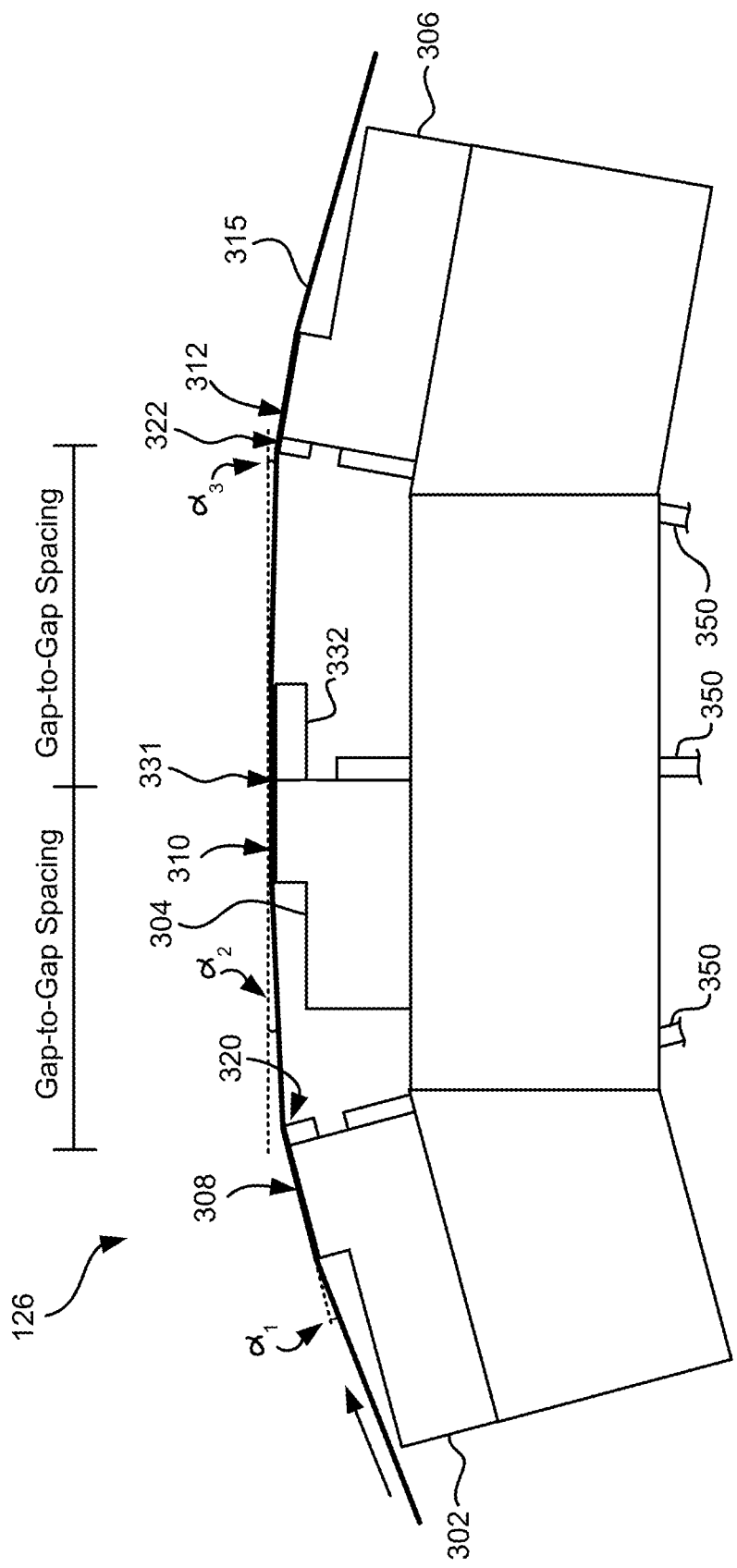
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

As previously mentioned, actuator assemblies may have multiple degrees of freedom. Such actuators may be able to selectively adjust the orientation and/or position of a magnetic head with respect to a magnetic medium during operation thereof. Accordingly, actuator assemblies having control over multiple degrees of freedom may be able to compensate for various operational conditions, e.g., tape skew, tape shifting, etc.

However, conventional products having multiple degrees of freedom experience an undesirable pitching motion during operation which degrades readback quality and inhibits track following performance.

In sharp contrast, various embodiments described herein introduce a number of actuator configurations which reduce pitching motion and thereby desirably improve performance. It is generally understood that an actuator assembly may be capable of traveling in a vertical (cross-track) direction by implementing two parallel flexures that are coupled to mechanical ground. However, as mentioned above, various embodiments described herein are preferably able to additionally rotate about an axis. To enable such functionality, flexures may be used to guide portions of the actuator assembly during rotation thereof, as will be described in further detail below.

Figure 8A:
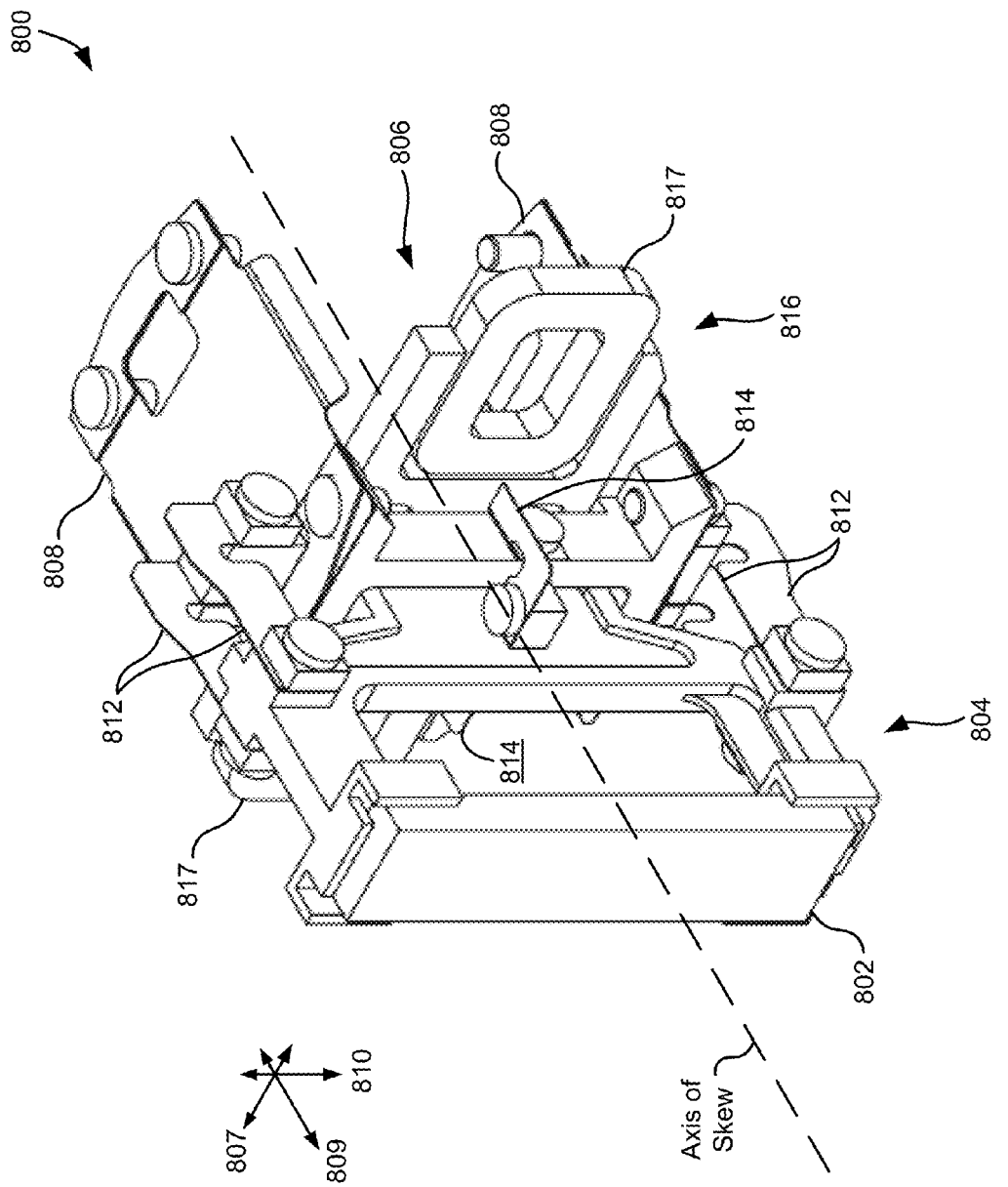
FIG. 8A is partial perspective view of an apparatus according to one embodiment.
Figure 8B:
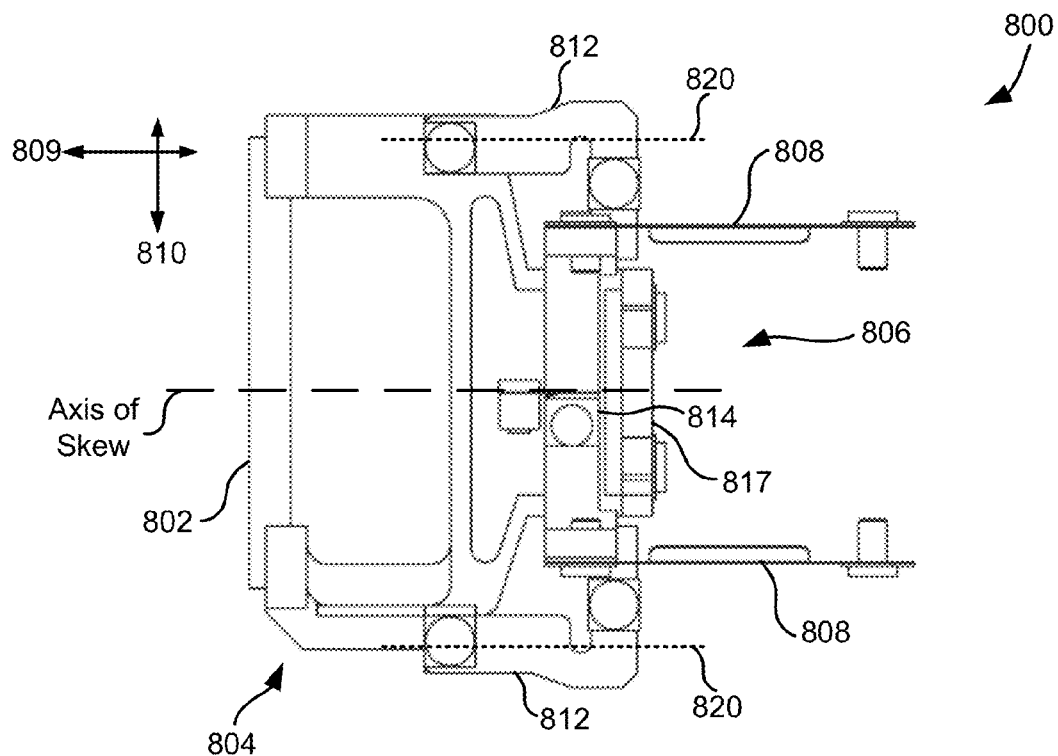
FIG. 8B is a side view of the apparatus from FIG. 8A.
Figure 8C:
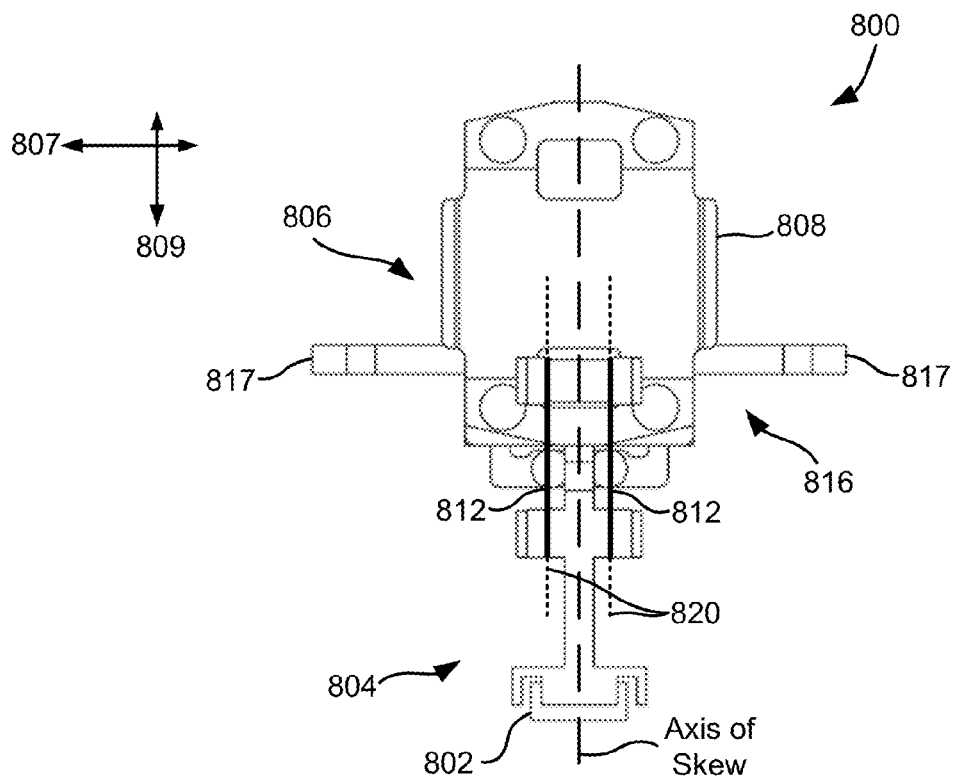
FIG. 8C is a top-down view of the apparatus from FIG. 8A.
Figure 8D:
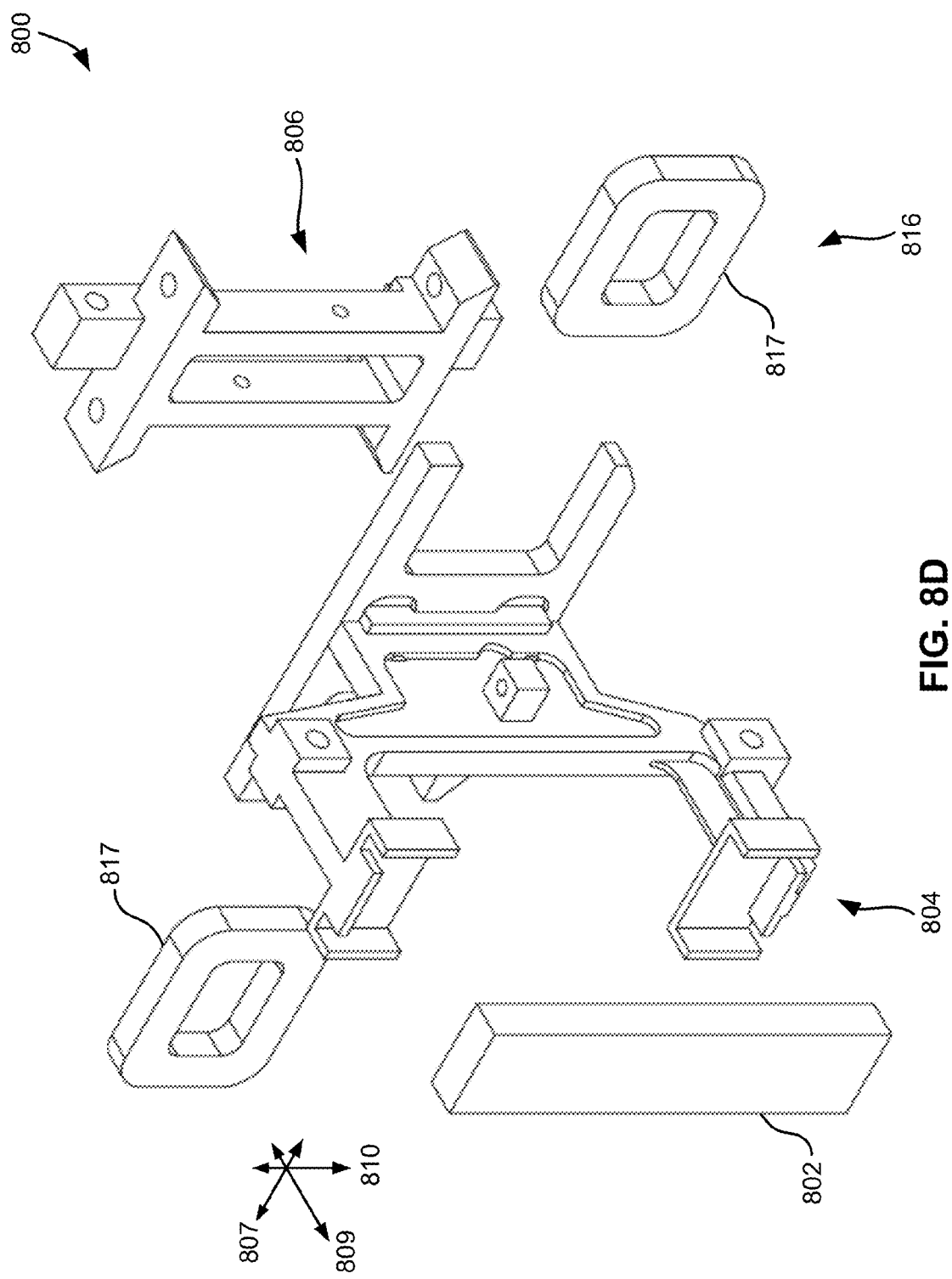
FIG. 8D is an exploded partial perspective view of the apparatus from FIG. 8A.

FIGS. 8A-8C depict an apparatus 800, in accordance with one embodiment. As an option, the present apparatus 800 may be implemented in conjunction with features from any other embodiment listed herein, such as those described with reference to the other FIGS., such as FIGS. 1A-7. However, such apparatus 800 and others presented herein may be used in various applications and/or in permutations which may or may not be specifically described in the illustrative embodiments listed herein. Further, the apparatus 800 presented herein may be used in any desired environment. Thus FIGS. 8A-8C (and the other FIGS.) may be deemed to include any possible permutation.

Referring now to FIGS. 8A-8C, the apparatus 800 includes a head carriage assembly 804 which may be used to hold a magnetic head 802, e.g., as shown. The head carriage assembly 804 may position the magnetic head 802 such that it may be presented to a magnetic medium passing thereover. Accordingly, magnetic head 802 may include read and/or write transducers as described above. Apparatus 800 further includes a linear assembly 806 which is configured to move along the fine motion direction 810, e.g., by way of a track, fine motion flexures 808, etc.

Furthermore, flexures 812 and anti-sway flexures 814 are used to couple the head carriage assembly 804 to the linear assembly 806. Flexures 812 may be used to prevent pitching motion of the head carriage assembly 804 while preserving the rotational freedom thereof, e.g., as will be described in further detail below. Moreover, anti-sway flexures 814 are preferably able to reduce motion of the head carriage assembly in the intended direction of media movement. Thus, as tape is passed over the magnetic head 802 of the head carriage assembly 804, the anti-sway flexures 814 may ensure the head carriage assembly 804 does not sway along the intended direction of media movement, e.g., as a result of the drag force caused from magnetic media being slid across the magnetic head 802. Although the apparatus 800 is illustrated as having multiple flexures 812 and anti-sway flexures 814 coupling the head carriage assembly 804 to the linear assembly 806, in alternate embodiments, different configurations may be implemented, e.g., see FIGS. 12A-13B below.

Referring still to FIGS. 8A-8C, according to some approaches, the flexures 812 and/or anti-sway flexures 814 may be the sole component coupling the head carriage assembly 804 to the linear assembly 806. In other words, in some approaches the head carriage assembly 804 and the linear assembly 806 may only be held together by the flexures 812 and/or anti-sway flexures 814. However, in other approaches, the head carriage assembly 804 and the linear assembly 806 may share some form of contact other than the flexures 812 and/or anti-sway flexures 814, e.g., surfaces thereof may abut.

The head carriage assembly 804 is preferably coupled to the linear assembly 806, e.g., via flexures 812 and anti-sway flexures 814, such that the flexures 812 and/or anti-sway flexures 814 permit the rotatable positioning of the head carriage assembly 804 about an axis of skew, as will be described in further detail below. Accordingly the head carriage assembly 804 may be able to rotate about an axis of skew without the use of a pivot pin. In other words, although the head carriage assembly 804 and the linear assembly 806 may be selectively rotated relative to each other, the apparatus 800 may be devoid of (e.g., not include) a pivot pin extending between the head carriage assembly 804 and the linear assembly 806 along the axis of skew. Thus, various approaches described herein do not include a pivot pin extending between the head carriage assembly 804 and the linear assembly 806 along the axis of skew. As used herein, the "axis of skew" is intended to extend perpendicular to a plane defined by an intended direction of media movement 807 across the head carriage assembly 804, and a fine motion direction 810 of the head carriage assembly 804. Moreover, the direction of fine motion (fine motion direction 810) is oriented about perpendicular to the intended direction of media movement 807 such that a position of the head carriage assembly 804 relative to the data tracks of a magnetic tape being passed thereover may be adjusted as desired, e.g., to compensate for shifting of the tape during operation.

Conventional products have been subject to undesirable movement of magnetic heads in a pitch direction during operation thereof. Flexures 812 and anti-sway flexures 814 as seen in FIGS. 8A-8C, or in accordance with any of the other embodiments described and/or suggested herein, are included to prevent this undesirable pitching motion from occurring during reading from and/or writing to a tape which may be traveling over the magnetic head 802. Pitching motion occurs when at least a portion of the apparatus moves in a pivoting fashion about an axis of the apparatus oriented along direction 807.

In contrast to approaches implementing a single pivot pin, which suffer from the aforementioned pitching motion, by implementing flexures as disclosed herein, the pitching motion, which again is undesirable for head track following performance, is attenuated. As a result, the bandwidth potential of the apparatus 800 is increased, because of the resulting better track following performance achieved when pitching is attenuated.

Referring still to FIGS. 8A-8C, apparatus 800 additionally includes a motor 816 coupled to the head carriage assembly 804, the motor 816 having two independently operable coils 817. The coils 817 are positioned such that the force generated by the currents passing through the coils 817 when energized control the position of the assembly, as would be appreciated by one skilled in the art upon reading the present description. Illustrative field generators may include hard magnets positioned near the coils and coupled to mechanical ground, which may move under control of the coarse actuator. As a result, the coils 817 of motor 816 are capable of inducing forces in a common direction and/or in opposite directions.

By using the coils 817 to induce forces in a common direction, the motor 816 is able to cause the head carriage assembly 804 to translate linearly along the fine motion direction 810. Similarly, by using the coils 817 to induce movement in a single direction but in unequal amounts, or in opposite (e.g., antiparallel) directions, the motor 816 is able to cause a rotation of the head carriage assembly 804 about the axis of rotation. Accordingly, current(s) may be applied to the coils of motor 816 in different combinations, in terms of magnitude and/or direction, to induce different movements of the head carriage assembly 804 and/or linear assembly 806.

As previously mentioned, the motor 816 may be used to rotatably position the head carriage assembly 804 about the axis of skew, by inducing a relative motion between the head carriage assembly 804 and the linear assembly 806. This ability to selectively rotate the head carriage assembly 804 about the axis of skew allows for the apparatus 800 to compensate for tape skew experienced during operation, e.g., while tape is being passed over the magnetic head 802.

In addition to being able to rotatably position the head carriage assembly 804 about the axis of skew, the motor 816 may also be used to move the head carriage assembly 804 in the fine motion direction 810, e.g., by way of a track, fine motion flexures 808, etc. Fine motion flexures 808 may be used to ensure that the linear assembly 806 travels in the fine motion direction 810 by restricting motion in alternate directions, e.g., along the intended direction of media movement 807. Furthermore, although the motor 816 may be used to move the linear assembly 806, flexures 812 and anti-sway flexures 814 couple the head carriage assembly 804 to the linear assembly 806, thereby transferring any motion of the fine motion direction 810 to the head carriage assembly 804 as well. In other words, the linear assembly 806 is preferably coupled to the head carriage assembly 804 (e.g., via flexures 812 and anti-sway flexures 814) such that the linear assembly 806 carries the head carriage assembly 804 along during movement in the fine motion direction 810. Accordingly, the motor 816 may enable the apparatus 800 to perform track following in addition to skew compensation during operation, preferably such that tape shifting may be overcome while reading from and/or writing to tape being passed over the magnetic head 802.

According to an example, which is in no way intended to limit the invention, the motor 816 may be an electromagnetic motor, e.g., such as a Lorentz force motor, a voice coil motor, etc. As will be appreciated by one skilled in the art upon reading the description, movement may be induced upon applying a current to each of the coils of the electromagnetic motor. Thus, appropriate selection of the current to apply to each of the coils of the electromagnetic motor may induce a movement of the head carriage assembly 804 about the axis of skew, e.g., for positioning the head carriage assembly relative to the intended direction of media movement 807. Moreover, appropriate selection of the current to apply to each of the coils may induce a movement of the head carriage assembly 804 in the fine motion direction 810, e.g., by way of the linear assembly 806 for track following. It follows that the apparatus 800 may be selectively positioned both in the fine motion direction 810 and about the axis of skew.

It should be noted that although the motor 816 is depicted in the present embodiment as being used to enable selective movement of the head carriage assembly 804 in the fine motion direction 810 as well as rotatably position the head carriage assembly 804 about the axis of skew, different types of motor configurations may be used to enable the respective movement in different embodiments. For example, according to alternative approaches, a first motor may be used to selectively move the head carriage assembly 804 in the fine motion direction 810 while a second motor may be used to rotatably position the head carriage assembly 804 about the axis of skew.

As previously mentioned, the linear assembly 806 is illustrated in the present embodiment as being coupled to the head carriage assembly 804 by flexures 812 and anti-sway flexures 814 extending therebetween. Thus, as the linear assembly 806 moves along the fine motion direction 810, the head carriage assembly 804 moves in the fine motion direction 810 as well. In other words, the linear assembly 806 and the head carriage assembly 804 effectively move as a single piece in the fine motion direction 810.

The longitudinal axes 820 of the flexures 812 extend from the head carriage assembly 804 to the linear assembly 806 in a direction generally parallel to the axis of skew, e.g., within about 15 degrees from being parallel with the axis of skew depending on the orientation of the head carriage assembly 804. First ends of the flexures 812 and anti-sway flexures 814 are preferably coupled to the head carriage assembly 804 while second ends of the flexures 812 and anti-sway flexures 814 are coupled to the linear assembly 806. It should be noted that the term "ends" is in no way intended to limit the invention. According to alternate approaches, portions of the flexures 812 and/or anti-sway flexures 814 may extend beyond the points of contact with the head carriage assembly 804 and/or the linear assembly 806, e.g., depending on available space.

Anti-sway flexures 814 are illustrated as being positioned at about the axis of skew. Conversely, the flexures 812 are also illustrated as being positioned towards outer extents of the head carriage assembly 804 as opposed to towards a central portion thereof near the axis of skew. However, according to some approaches, one or more flexures may be positioned at about the axis of skew, e.g., see FIGS. 12A-12E below.

Referring still to FIGS. 8A-8C, as described above, it is preferred that the motor 816 is able to rotatably position the head carriage assembly 804 about the axis of skew. Thus, although the head carriage assembly 804 and the linear assembly 806 are coupled together by the flexures 812 and anti-sway flexures 814, the ability to selectively rotate the head carriage assembly 804 about the axis of skew is preserved. Accordingly, the flexures 812 and anti-sway flexures 814 are preferably able to permit the rotatable positioning of the head carriage assembly 804 about the axis of skew.

Figure 9A:
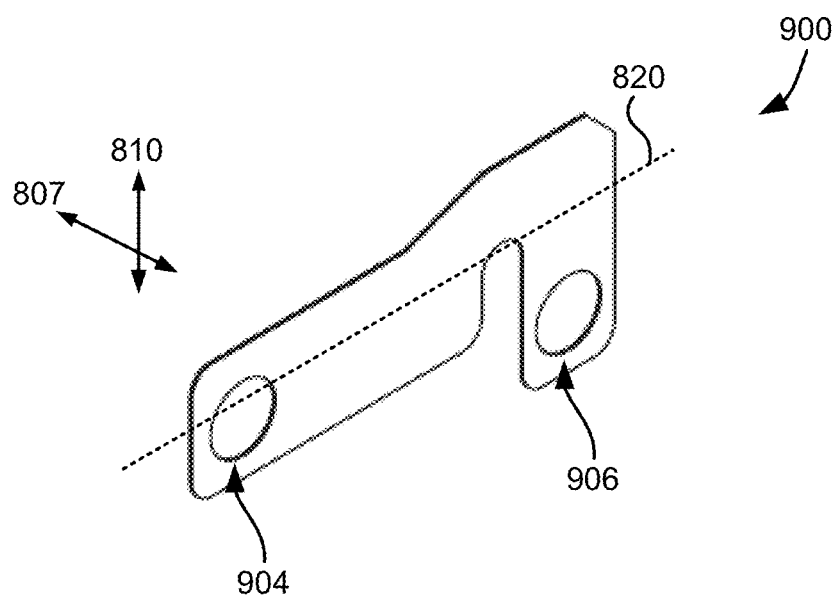
FIG. 9A is a partial perspective view of a flexure according to one embodiment.
Figure 9B:
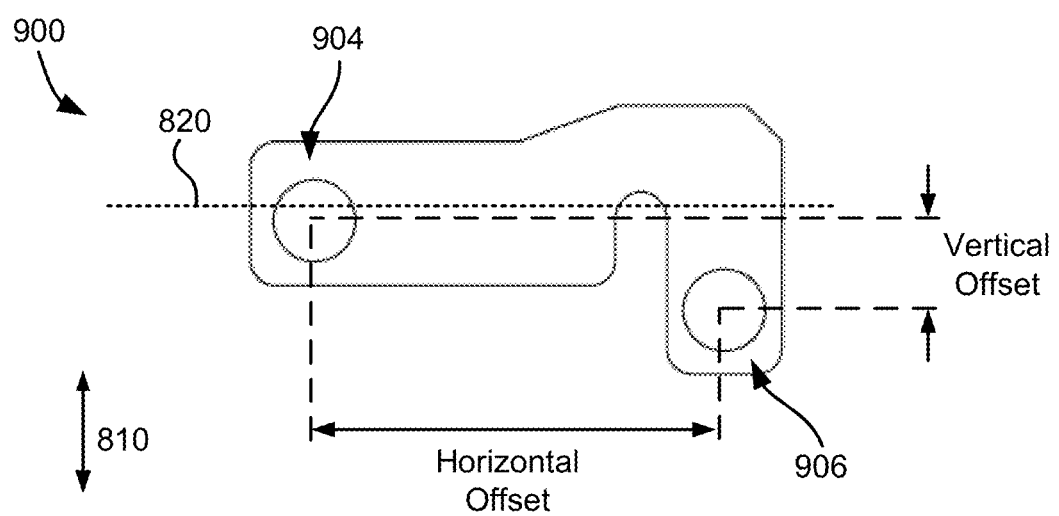
FIG. 9B is a side view of the flexure from FIG. 9A.

Looking to FIGS. 9A-9B, detailed views of a flexure 900 are shown, in accordance with one embodiment. As an option, the present flexure 900 may be implemented in conjunction with features from any other embodiment listed herein, such as those described with reference to the other FIGS., such as FIGS. 8A-8C. Specifically, FIGS. 9A-9B illustrate detailed views of a flexure as presented in the embodiment of FIGS. 8A-8C. Accordingly, various components of FIGS. 9A-9B have common numbering with those of FIGS. 8A-8C.

However, such flexure 900 and others presented herein may be used in various applications and/or in permutations which may or may not be specifically described in the illustrative embodiments listed herein. Further, the flexure 900 presented herein may be used in any desired environment. Thus FIGS. 9A-9B (and the other FIGS.) may be deemed to include any possible permutation.

Flexure 900 is shown as having a rectangular cross section taken perpendicular to a longitudinal axis 820 thereof. Moreover, a dimension of the cross section is greater (e.g., longer) in the fine motion direction 810 than the intended direction of media movement 807. A first mounting point 904 may be used to couple the flexure 900 to a head carriage assembly as seen in FIGS. 8A-8C, while a second mounting point 906 may be used to couple the flexure 900 to a linear assembly, again as seen in FIGS. 8A-8C. However, referring still to FIGS. 9A-9B, the aforementioned orientation of the flexure 900 is in no way intended to limit the invention. According to other approaches, the first mounting point 904 may be used to couple the flexure 900 to a linear assembly while the second mounting point 906 is used to couple the flexure 900 to a head carriage assembly.

In various approaches, the flexure 900 may be coupled to a head carriage assembly and/or linear assembly using different processes. Accordingly, the flexure 900 may be coupled to a head carriage assembly and/or linear assembly using bolts, screws, tongue and groove joints, clips, clamp, spot welding, soldering, known coupling components and/or processes, etc., depending on the desired embodiment. It follows that, depending on the fashion which the flexure 900 is to be coupled to a head carriage assembly and/or linear assembly, the mounting points 904, 906 may be varied. For example, the mounting points 904, 906 are depicted as being circular holes in FIGS. 9A-9B which may correspond to using a bolt, screw, etc. to couple the flexure to the head carriage assembly and/or linear assembly. However, according to other examples, one or more of the mounting points 904, 906 may be a tongue, groove, clamp, etc., depending on the manner in which the flexure 900 may be coupled to a head carriage assembly and/or linear assembly.

The shape of flexure 900 preserves the ability to rotatably position the head carriage assembly 804 about the axis of skew without being over constrained after implementing the flexure 900 in an apparatus. Referring still to FIGS. 9A-9B, the flexure 900 is depicted as having a generally "L-shaped" profile. This allows for the first and second mounting points 904, 906 to be offset from each other in the fine motion direction 810 (also referred to herein as a "vertical offset"). In other words, the centers of the first and second mounting points 904, 906 do not align in a direction parallel to the longitudinal axis 820 of the flexure 900. The vertical offset between mounting points 904, 906 causes torque in the flexure when opposite forces are applied to the flexure 900 at the mounting points 904, 906. For example, when rotatably positioning the head carriage assembly of an apparatus about an axis of skew as described above, opposite forces will be applied to the flexure 900 at the mounting points 904, 906, thereby introducing torque.

Thus, depending on the dimensions and/or properties of the flexure 900, torque applied to the flexure 900 may cause torsional deformation of the flexure 900. It follows that the vertical offset allows for the skew motion to occur without causing a high tension condition when the head carriage assembly 804 is rotated about the axis of skew.

Moreover, the first and second mounting points 904, 906 are also offset from each other in a direction perpendicular to the fine motion direction 810 (also referred to herein as a "horizontal offset"). The greater the value of the horizontal offset, the more susceptible the flexure is to torsional deformation. However, the horizontal offset is preferably low enough to prevent flexing (e.g., deformation) of the flexure 900 in the fine motion direction 810. It follows that the horizontal offset and vertical offset may be adjusted based on the desired embodiment, e.g., depending on flexure dimensions, materials, etc. However, vertical and/or horizontal offsets of one or more flexures may be constrained by the availability of space in a corresponding tape drive. For example, the hump along the top edge of the flexure 900 in FIGS. 9A-9B may be included in a given embodiment in an attempt to gain vertical height. Accordingly, it should be noted that according to different embodiments, variations of the design (e.g., profile) of the flexure 900 illustrated in FIGS. 9A-9B may be used.

Figure 10A:
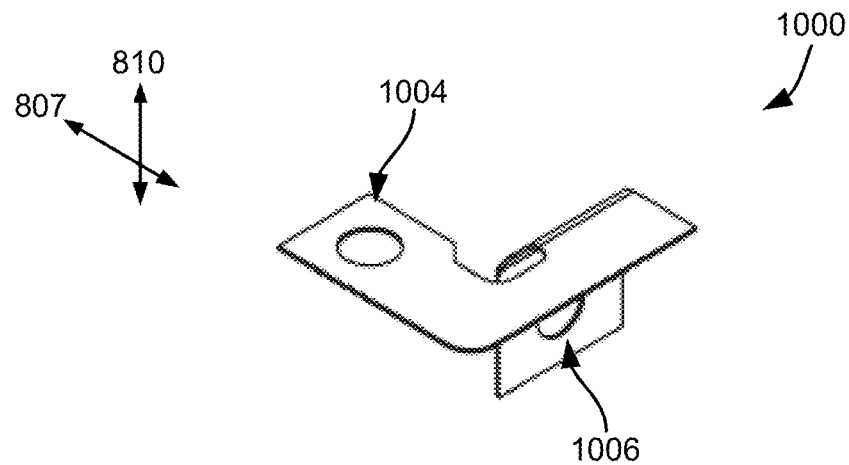
FIG. 10A is a partial perspective view of an anti-sway flexure according to one embodiment.
Figure 10B:
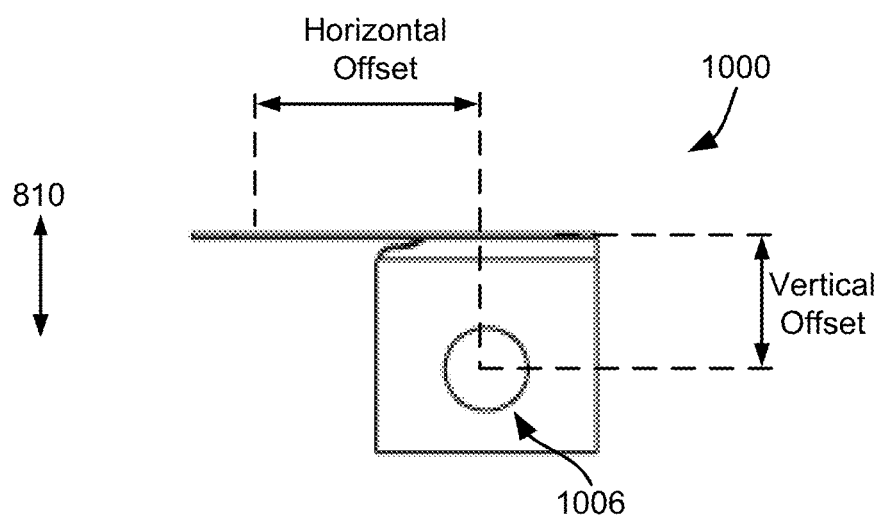
FIG. 10B is a side view of the anti-sway flexure from FIG. 10A.
Figure 11A:
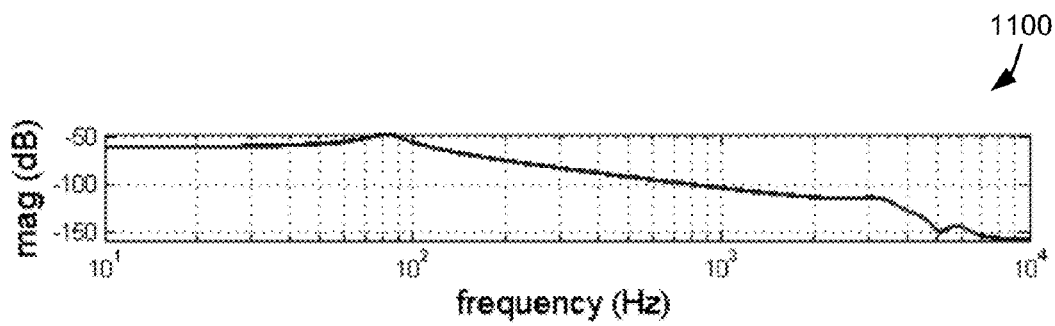
FIG. 11A is a graph of magnitude vs. frequency according to one embodiment.
Figure 11B:
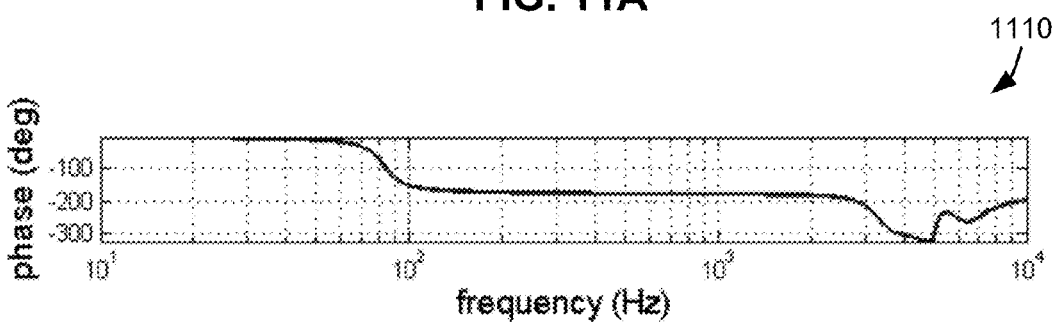
FIG. 11B is a graph of phase vs. frequency according to one embodiment.
Figure 11C:
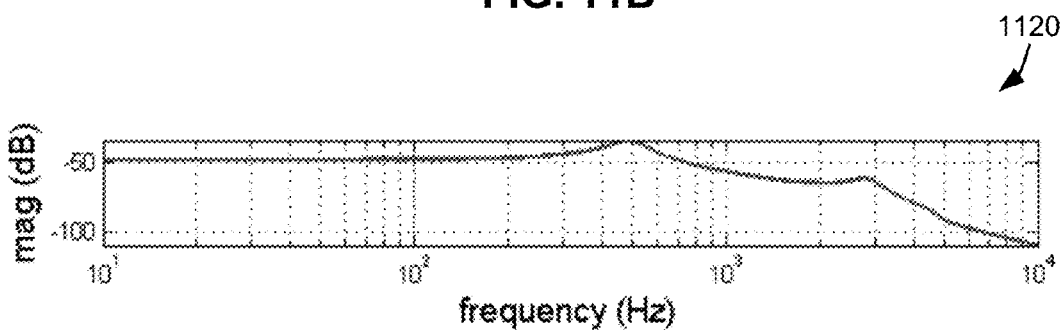
FIG. 11C is a graph of magnitude vs. frequency according to one embodiment.
Figure 11D:
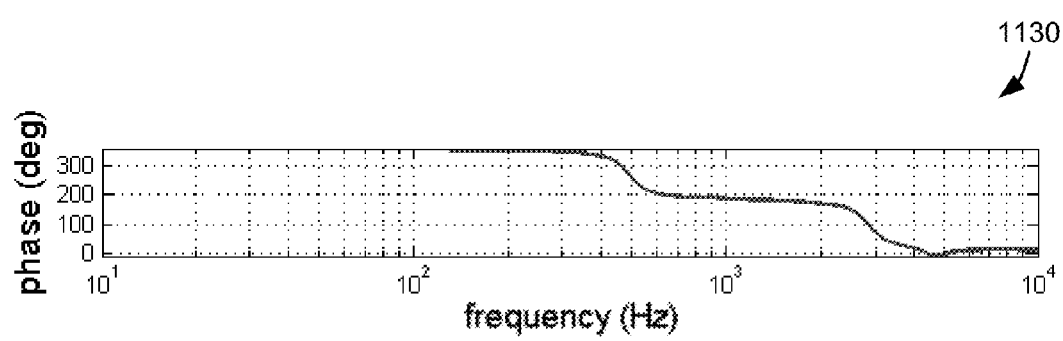
FIG. 11D is a graph of phase vs. frequency according to one embodiment.

Looking now to FIGS. 10A-10B, detailed views of an anti-sway flexure 1000 are shown, in accordance with one embodiment. As an option, the present anti-sway flexure 1000 may be implemented in conjunction with features from any other embodiment listed herein, such as those described with reference to the other FIGS., such as FIGS. 8A-8C. Specifically, FIGS. 10A-10B illustrate detailed views of an anti-sway flexure as presented in the embodiment of FIGS. 8A-8C. Accordingly, various components of FIGS. 10A-10B have common numbering with those of FIGS. 8A-8C.

However, such anti-sway flexure 1000 and others presented herein may be used in various applications and/or in permutations which may or may not be specifically described in the illustrative embodiments listed herein. Further, the anti-sway flexure 1000 presented herein may be used in any desired environment. Thus FIGS. 10A-10B (and the other FIGS.) may be deemed to include any possible permutation.

As described above, the anti-sway flexure 1000 is preferably configured to reduce motion of a head carriage assembly (e.g., as seen in FIGS. 8A-8C) in the intended direction of media movement 807. Moreover, the anti-sway flexure 1000 employs a general "L-shaped" profile as described above for the flexures. Accordingly, first and second mounting points 1004, 1006 of the anti-sway flexure 1000 may be offset from each other in the fine motion direction 810 (also referred to herein as a "vertical offset"). The vertical offset between mounting points 1004, 1006 causes torque in the anti-sway flexure when opposite forces are applied to the anti-sway flexure 1000 at the mounting points 1004, 1006. For example, when rotatably positioning the head carriage assembly of an apparatus about an axis of skew as described above, opposite forces will be applied to the anti-sway flexure 1000 at the mounting points 1004, 1006, thereby introducing torque.

Thus, as described above, depending on the dimensions and/or properties of the anti-sway flexure 1000, torque applied to the anti-sway flexure 1000 may cause torsional deformation of the anti-sway flexure 1000. It follows that the vertical offset allows for the skew motion to occur without causing a high tension condition when the head carriage assembly 804 is rotated about the axis of skew.

Moreover, the first and second mounting points 1004, 1006 are also offset from each other in a direction perpendicular to the fine motion direction 810 (also referred to herein as a "horizontal offset"). The greater the value of the horizontal offset, the more susceptible the anti-sway flexure is to torsional deformation. However, the horizontal offset is preferably low enough to prevent flexing (e.g., deformation) of the anti-sway flexure 1000 in the fine motion direction 810. It follows that the horizontal offset and vertical offset may be adjusted based on the desired embodiment, e.g., depending on anti-sway flexure dimensions, materials, etc. as described above. Accordingly, it should be noted that according to different embodiments, variations of the design (e.g., profile) of the anti-sway flexure 1000 illustrated in FIGS. 10A-10B may be used.

It should also be noted that although anti-sway flexures 1000 are preferably included in a given embodiment, e.g., to prevent swaying motion of head carriage assemblies in the intended direction of media motion, they are in no way required. For example, in some approaches, flexure properties may be adjusted to compensate for the absence of anti-sway flexures as desired.

Referring again to FIGS. 8A-8C, the flexures 812 and anti-sway flexures 814 are preferably able to permit the rotatable positioning of the head carriage assembly 804 about the axis of skew. Thus, by selecting the dimensions and/or properties of the flexures 812 and anti-sway flexures 814, a desired amount of deformation may be induced as a result of applying forces thereto. Specifically, the motor 816 may cause the head carriage assembly 804 to rotate about the axis of skew while the linear assembly 806 is kept stationary. The relative rotation of the head carriage assembly 804 with respect to the linear assembly 806 causes opposite forces to be applied on the flexures 812 and anti-sway flexures 814 at the mounting points thereof (e.g., seen in FIGS. 9A-10B), resulting in the flexures 812 and anti-sway flexures 814 experiencing a torsional force (e.g., torque) which causes them to torsionally deform. Accordingly, the flexures 812 and/or anti-sway flexures 814 are desirably able to permit the rotatable positioning of the head carriage assembly 804 about the axis of skew.

It follows that the flexures 812 and/or anti-sway flexures 814 may be resiliently deformable, e.g., such that any deformation of the flexures 812 and/or anti-sway flexures 814 is fully recoverable when the forces are no longer being applied.

According to an exemplary embodiment, which is in no way intended to limit the invention, the flexures 812 may include steel having a thickness of about 0.1 mm. According to another example, it may be desirable that one or more of the flexures 812 are each a single piece of material. However, in other embodiments, one or more of the flexures 812 and/or anti-sway flexures 814 may include plastics, metals, or other materials capable of withstanding prolonged, repetitive motion while maintaining structural integrity may be used, and/or laminates thereof.

However, it is also desirable that the flexures 812 and/or anti-sway flexures 814 are able to resist pitching movement of the head carriage assembly 804 relative to the linear assembly 806, thereby preserving the track following abilities of the linear assembly 806 in the fine motion direction 810. As described above with reference to FIGS. 9A-9B, flexures are presented herein as having a rectangular cross section taken perpendicular to a longitudinal axis thereof. Moreover, a dimension of the cross section is greater (e.g., longer) in the fine motion direction 810 than the intended direction of media movement 807. Accordingly, the flexures 812 are effectively constrained from deforming in the fine motion direction 810. In other words, the length of the flexure along its longitudinal axis 820 is able to effectively resist any pitching motion as the motion is working against the cross section of the flexure which is resilient in nature. Moreover, it follows that the design of the flexure in the current embodiment allows for skew motion to occur with minimal resistance. Implementing motion in the fine motion direction 810 is also desirably preserved in view of the rigidity of the flexures 812 along their longitudinal axis 820.

The flexures 812 and/or anti-sway flexures 814 may be coupled to the head carriage assembly 804 and/or the linear assembly 806 using any approach which preserves their ability to permit the rotatable positioning of the head carriage assembly 804 about the axis of skew, and resist the pitching movement of the head carriage assembly 804 relative to the linear assembly 806. Accordingly, the flexures 812 and/or anti-sway flexures 814 may be coupled to the head carriage assembly 804 and/or the linear assembly 806 using bolts, screws, tongue and groove joints, clips, etc., depending on the desired embodiment.

Again, it is desirable that the flexures 812 are positioned symmetrically relative to each other about the axis of skew as shown in FIGS. 8A-8C. It is also desirable that the anti-sway flexures 814 are positioned symmetrically relative to each other about the axis of skew as shown in FIGS. 8A-8C. Positioning the flexures 812 and/or anti-sway flexures 814 symmetrically relative to each other about the axis of skew allows for improved rotational performance of the head carriage assembly 804. According to an example, for embodiments including only two flexures 812, the flexures 812 may be coupled to the head carriage assembly 804 along a line traversing and oriented perpendicular to the axis of skew. Furthermore, the flexures 812 are preferably about centered relative to a head receiving portion of the head carriage assembly 804, e.g., such that the two flexures 812 are about symmetrical relative to each other about the axis of skew. Thus, it is preferred that embodiments including two or more flexures implement symmetry among the flexures, e.g., about an axis of rotation, but in no way required. For example, two or more flexures may be asymmetrically positioned relative to an axis of rotation to increase a resistance of motion in a given direction (e.g., motion in the pitch direction). Moreover, although it is preferred that flexures 812 include the same materials, dimensions, properties, etc., in some approaches, certain aspects of the flexures 812 may differ. The same may also be true for anti-sway flexures 814 depending on the embodiment.

Although apparatus 800 is depicted as including four flexures 812 and two anti-sway flexures 814 in FIGS. 8A-8C, the number of flexures and/or anti-sway flexures that may be added to a given embodiment is in no way limited thereto. According to various embodiments, apparatus 800 may include at least one, at least two, at least three, at least four, at least five, multiple, etc. flexures and/or anti-sway flexures. However, depending on the number of flexures and/or anti-sway flexures included in a given embodiment, it again desirable, but in no way required, that the flexures and/or anti-sway flexures are positioned symmetrically relative to each other about the axis of skew, as would be appreciated by one skilled in the art upon reading the present description.

Moreover, the number of flexures 812 and/or anti-sway flexures 814 included in a given embodiment may affect the desired properties of the flexures 812 and/or anti-sway flexures 814, e.g., such as thickness, width, length, material composition, etc. For example, the desired flexure properties for embodiments having four flexures 812 (e.g., as seen in FIGS. 8A-8C) may include flexures that are less rigid than flexure properties desired for embodiments having two flexures. The more flexures used in a given embodiment, the more resistant the combined flexure effect is to torsion. Specifically, adjusting the properties of the flexures utilizes a correlation between the rigidity along the longitudinal axis of a flexure, and the flexure's resistance to torsion. Thus, by adjusting the properties of flexures 812 and/or anti-sway flexures 814 in different embodiments, the combined effect of four flexures 812 and two anti-sway flexures 814 may be about the same as the combined effect of an embodiment having a different number of flexures 812 and/or anti-sway flexures 814.

FIGS. 11A-11D include graphs 1100, 1110, 1120, 1130 which illustrate dynamic response results obtained from simulations of the above embodiments implementing a single flexure as presented in FIGS. 8A-8D. The plots shown in graphs 1100, 1110 correspond to simulations using actuated track-following, e.g., which involves motion of the head in the fine motion direction, guided by the horizontal flexures. Moreover, the plots shown in graphs 1120, 1130 correspond to simulations in which rotational head movement was enacted. Upon examining the graphs 1100, 1110, 1120, 1130, it may be determined that they indicate the principal deviation from an ideal dynamic behavior occurs at a frequency of about 3.2 kHz for both fine motion (graphs 1100, 1110) and rotational motion (graphs 1120, 1130). It follows that, the results achieved by implementing flexures as disclosed herein produce adequately high bandwidth for apparatuses such as tape drive actuator systems. Moreover, implementing the flexures results in substantial improvement to the track-follow performance compared to that of conventional designs, e.g., by suppressing the undesirable pitching motion.

It follows that the embodiments illustrated in FIGS. 8A-10B enabling a rotational (e.g., pivot) motion of an actuator assembly while ensuring desirable bandwidth for tape drive actuator systems. It should also be noted that the embodiment illustrated in FIGS. 8A-8D utilizes flexural components to obtain the rotational motion of the head carriage assembly, thereby enabling a guiding functionality while additionally achieving comparable performance improvements over conventional products.

Figure 12A:
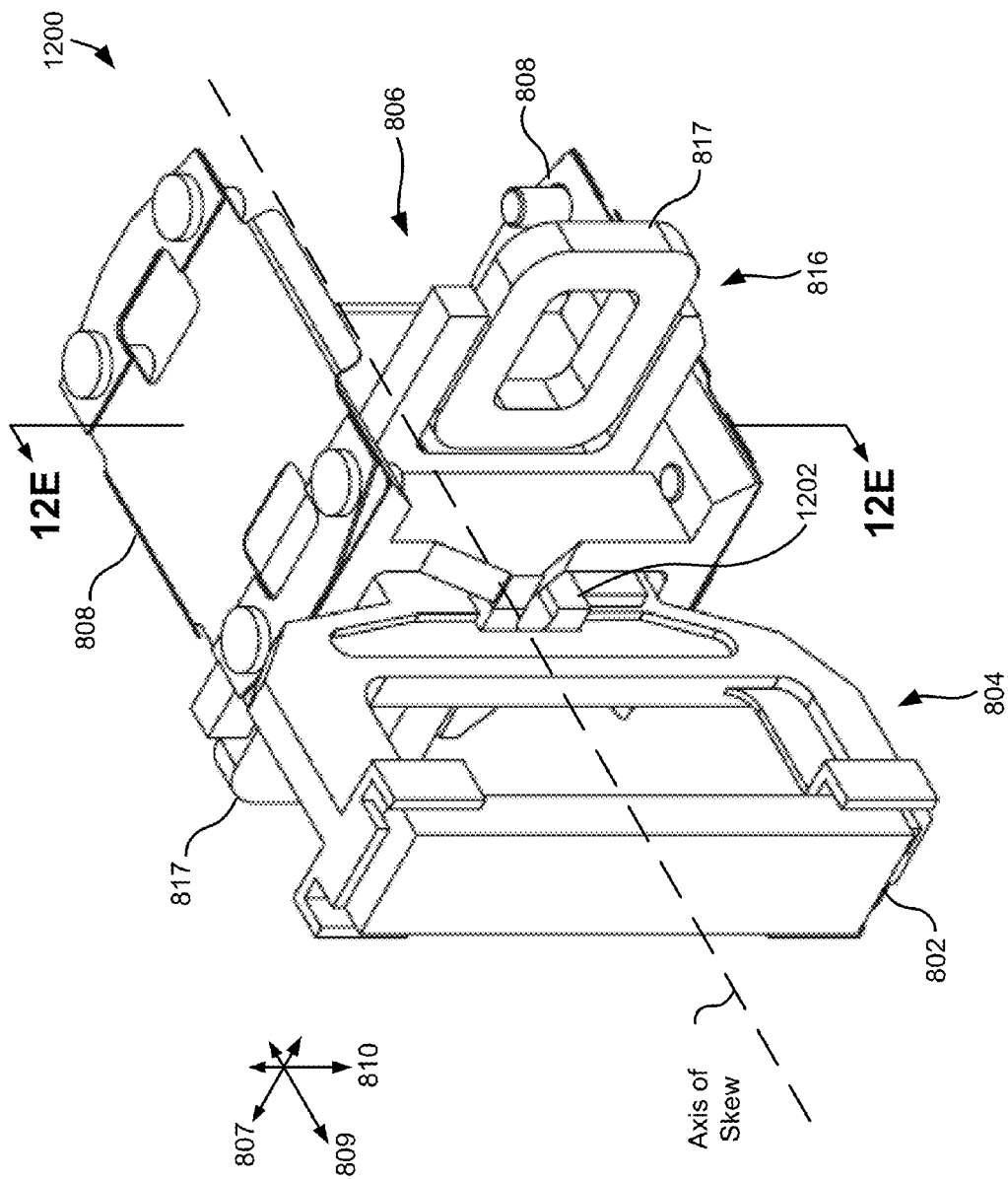
FIG. 12A is partial perspective view of an apparatus according to one embodiment.
Figure 12B:
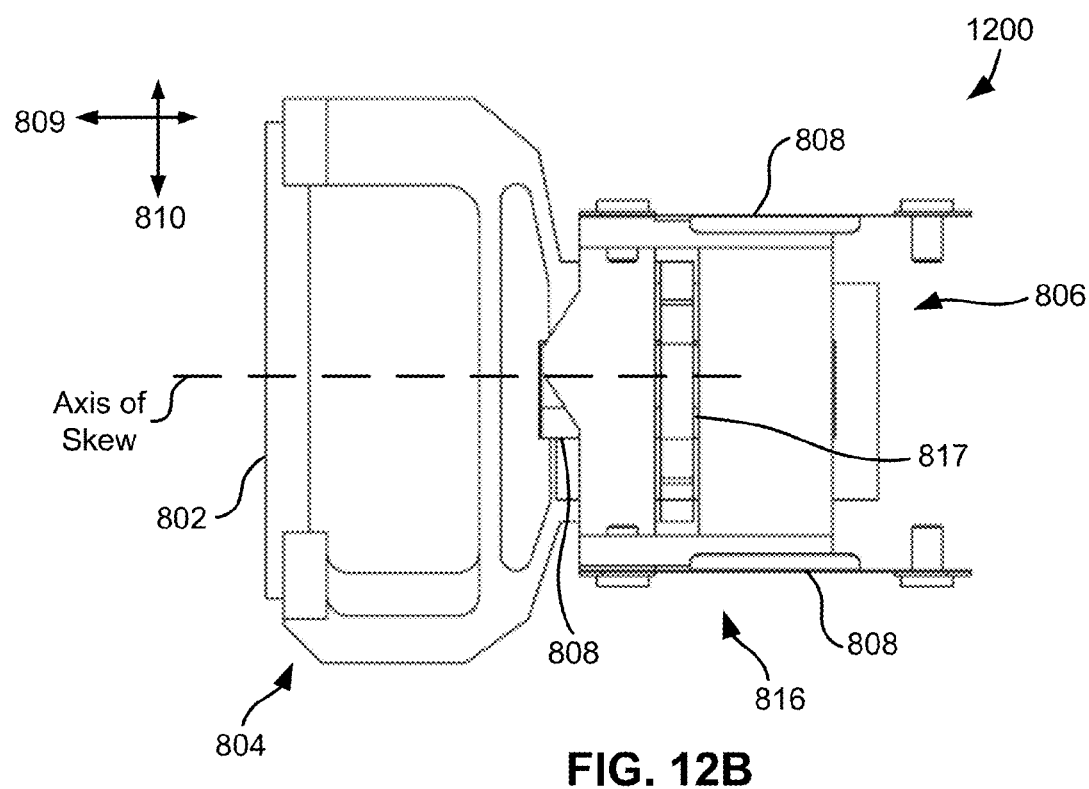
FIG. 12B is a side view of the apparatus from FIG. 12A.
Figure 12C:
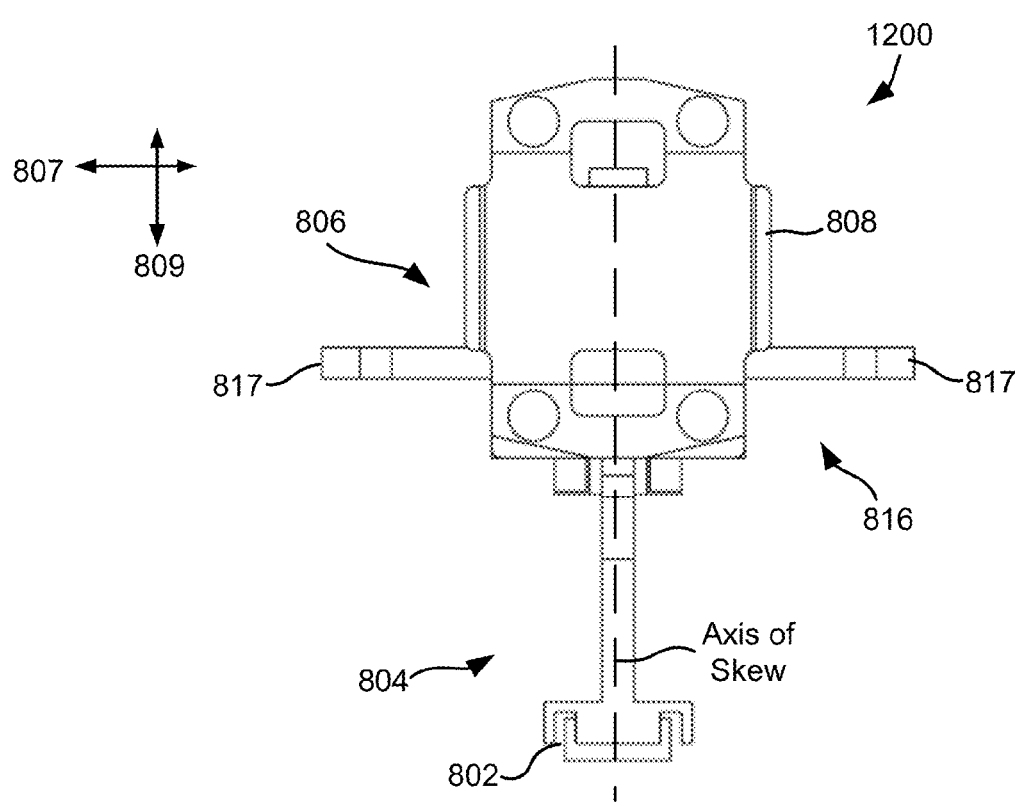
FIG. 12C is a top-down view of the apparatus from FIG. 12A.

As alluded to above, different configurations may be implemented for coupling a head carriage assembly to a linear assembly. Specifically, looking to FIGS. 12A-12C, an apparatus 1200 is depicted in accordance with one embodiment. As an option, the present apparatus 1200 may be implemented in conjunction with features from any other embodiment listed herein, such as those described with reference to the other FIGS., such as FIGS. 1A-8C. Specifically, FIGS. 12A-12C illustrate variations of the embodiment of FIGS. 8A-8C depicting several exemplary configurations within an apparatus 1200. Accordingly, various components of FIGS. 12A-12C have common numbering with those of FIGS. 8A-8C.

However, such apparatus 1200 and others presented herein may be used in various applications and/or in permutations which may or may not be specifically described in the illustrative embodiments listed herein. Further, the apparatus 1200 presented herein may be used in any desired environment. Thus FIGS. 12A-12C (and the other FIGS.) may be deemed to include any possible permutation.

Referring now to FIGS. 12A-12C, the apparatus 1200 includes a head carriage assembly 804 which may be used to hold a magnetic head 802, e.g., as shown. Apparatus 1200 further includes a linear assembly 806 which is configured to move along the fine motion direction 810, e.g., by way of a track, fine motion flexures 808, etc.

Apparatus 1200 additionally includes a flexure 1202 which extends and bends along (e.g., about) the axis of skew. Moreover, flexure 1202 is used to couple the head carriage assembly 804 to the linear assembly 806. Thus, rather than using multiple flexures positioned away from the axis of skew to enable and guide rotation of portions of an apparatus, e.g., as seen in alternate embodiments herein, the depicted embodiment of apparatus 1200 implements a beam-shaped flexure 1202. Flexure 1202 may thereby function as a hinge guiding the relative motion of the rigid bodies it connects (the carriage assembly 804 and the linear assembly 806). In some illustrative approaches, flexure 1202 may be considered a "hinge beam" as would be appreciated by one skilled in the art upon reading the present description.

As described above, flexure 1202 is preferably used to prevent pitching motion of the head carriage assembly 804 while preserving the rotational freedom thereof. Thus, as tape is passed over the magnetic head 802 of the head carriage assembly 804, the flexure 1202 may ensure the head carriage assembly 804, or portion thereof, does not undergo motion in the pitching direction 809.

Figure 12D:
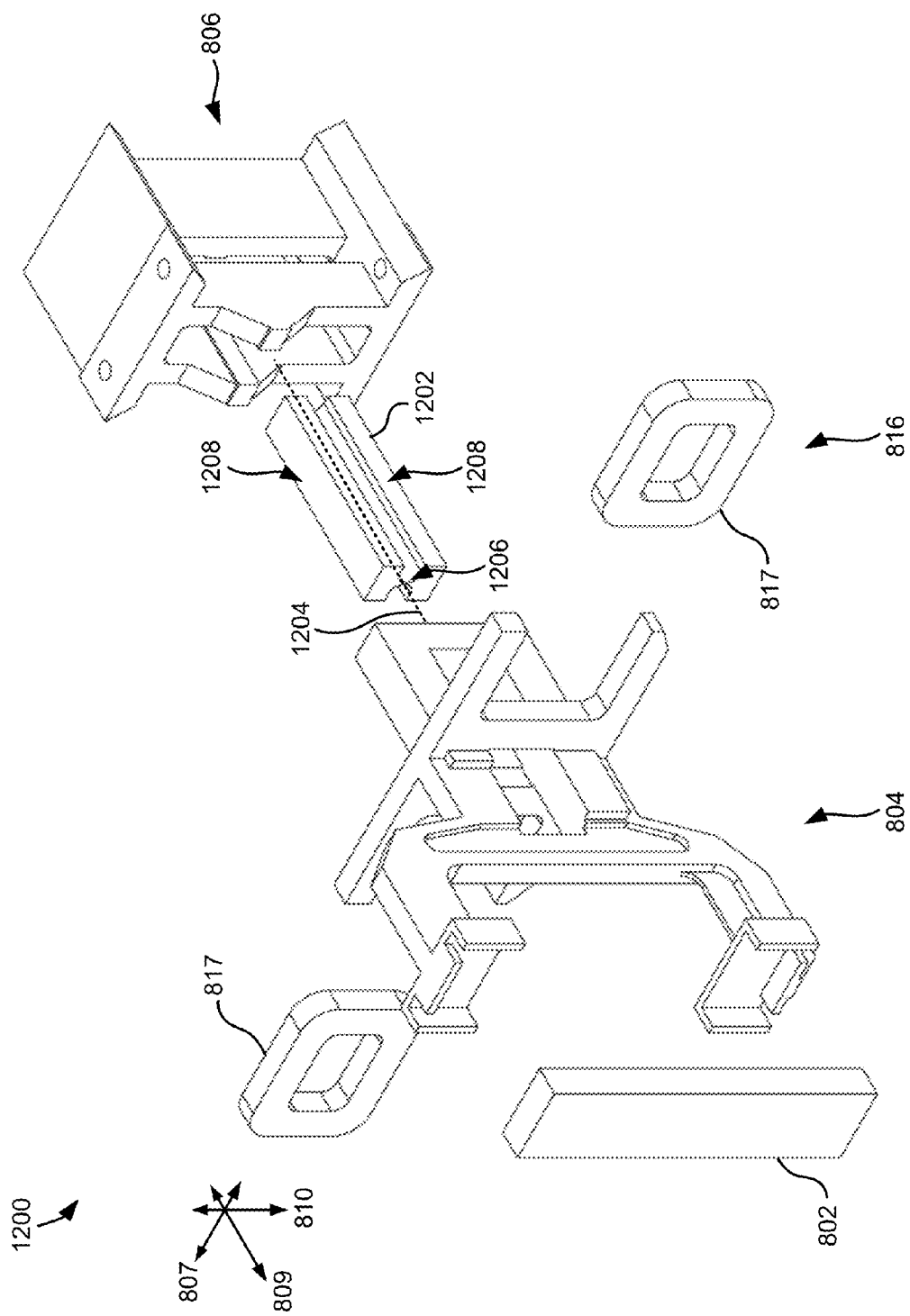
FIG. 12D is an exploded partial perspective view of the apparatus from FIG. 12A.

Looking to the exploded view of the apparatus 1200 shown in FIG. 12D, flexure 1202 includes a pivot portion 1206 extending between two main beams 1208 which serve as stiff bases for the flexure 1202. Moreover, flexure 1202 is positioned such that its longitudinal axis 1204 is coincident (e.g., about parallel) with the axis of skew. Accordingly, flexure 1202 may extend and/or bend along the axis of skew.

Figure 12E:
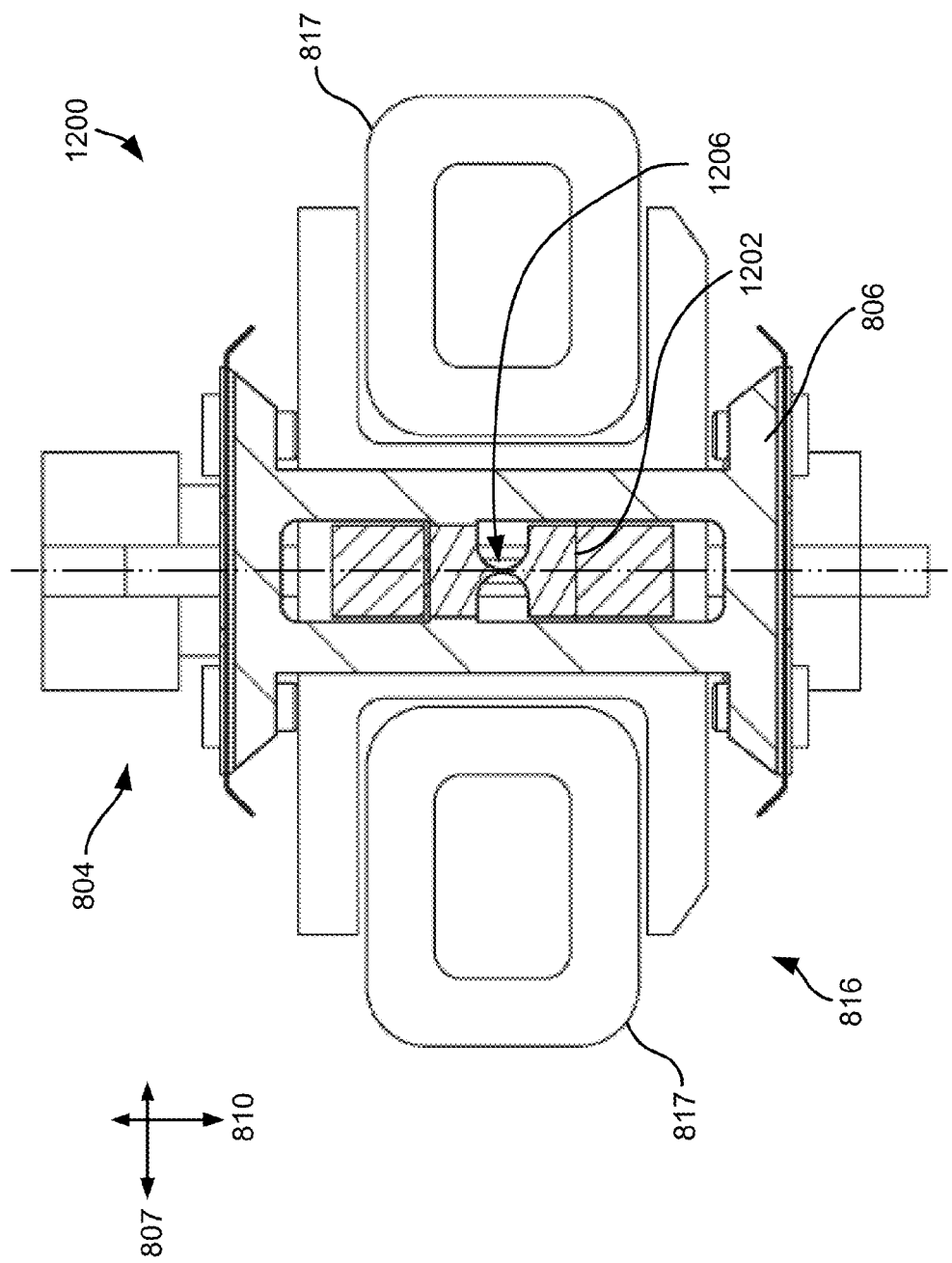
FIG. 12E is a cross-sectional view of the apparatus from FIG. 12A taken along line 12E-12E.

Furthermore, the cross-sectional view of the apparatus 1200 in FIG. 12E illustrates the desired placement of the flexure 1202 in relation to the remainder of the apparatus 1200. Each of the respective main beams 1208 are coupled to one of the linear assembly 806 and the head carriage assembly 804 respectively. For example, an upper one of the main beams 1208 may be coupled to the head carriage assembly 804 while a lower one of the main beams 1208 may be coupled to the linear assembly 806. It should be noted that the terms "upper" and "lower" are in no way intended to limit the invention, but rather are presented by way of example only. According to some approaches, the main beams 1208 may be coupled to the linear assembly 806 and the head carriage assembly 804 by being bonded to appropriately shaped slots and/or surfaces of the two rigid parts of the apparatus 1200 which are to experience relative rotation. However, depending on the desired approach, the main beams 1208 may be coupled to the linear assembly 806 and the head carriage assembly 804 using fasteners, adhesives, locking joints, welding, etc.

Referring still to the cross-sectional view of FIG. 12E, during rotational movement, the linear assembly 806 remains fixed, while the head carriage assembly 804 (which also holds the coils 817) is rotated following the applied torque generated at the coils 817. In view of the fact that the flexure 1202 may provide the only effective connection between the head carriage assembly 804 and the linear assembly 806, virtually all the material strain which arises during the rotational positioning of the head carriage assembly 804 about the axis of skew is localized at the narrow region of the flexure 1202.

In other words, the shape of the narrow pivot portion 1206 causes the flexure 1202 to function as a hinge, thereby guiding the relative motion of the two stiffer main beams 1208 to be rotational. Thus, the design of the flexure 1202 allows for the relative rotation of a head carriage assembly 804 with respect to the linear assembly 806 by causing the flexure 1202 to bend at the pivot portion 1206 along the axis of skew.

Thus, referring again to FIG. 12D, it is preferred that the dimensions, shape, material composition, etc., of the pivot portion 1206 and the main beams 1208 are chosen to achieve a flexure 1202 having a desirable stiffness (resistance to deformation). For example, it is preferred that the pivot portion 1206 is "soft" (e.g., deformable) enough to achieve a desired amount of rotation without dissipating excessive actuation power. However, the pivot portion 1206 is also preferably "stiff" (e.g., resistant to deformation) enough to suppress relative motions between components of the apparatus 1200 other than the desired rotation. This balancing of pivot portion 1206 characteristics may be especially important when an apparatus 1200 is subject to environmental vibration, e.g., see graphs 1400-1430 of FIGS. 14A-14D below.

It is also preferred that the flexure 1202, e.g., specifically the pivot portion 1206 of the flexure 1202, is resiliently deformable. Thus, the flexure 1202 may be deformed such that the flexure 1202 may be bent along the axis of skew when ample forces are applied thereto, and then return to a nominal position (e.g., as shown in FIGS. 12A-13B) when ample forces are not applied. Essentially, the flexure 1202 acts as a spring having a finite pullback strength towards a nominal position (e.g., as shown in FIGS. 12A-13B). Thus, when the flexure 1202 is not activated (e.g., no external force is applied thereto) the flexure returns to its nominal (e.g., rest) position. However, when an external force activates the flexure, the force works against the spring force of the flexure 1202. It follows that, in sharp contrast to actuator assemblies having a pivot pin which does not have a callback force to a rest position, the embodiments described herein do have a callback force which may be desirable in terms of controlling the position of a magnetic head in the rotational degree of freedom about an axis of skew.

Figure 13A:
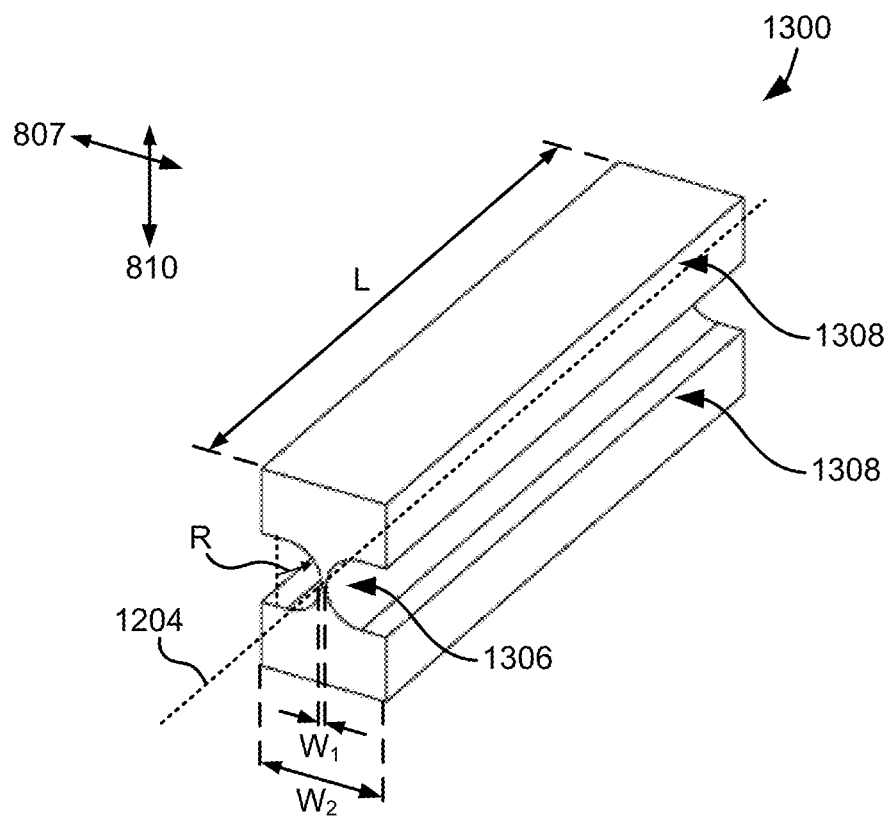
FIG. 13A is a partial perspective view of a flexure according to one embodiment.
Figure 13B:
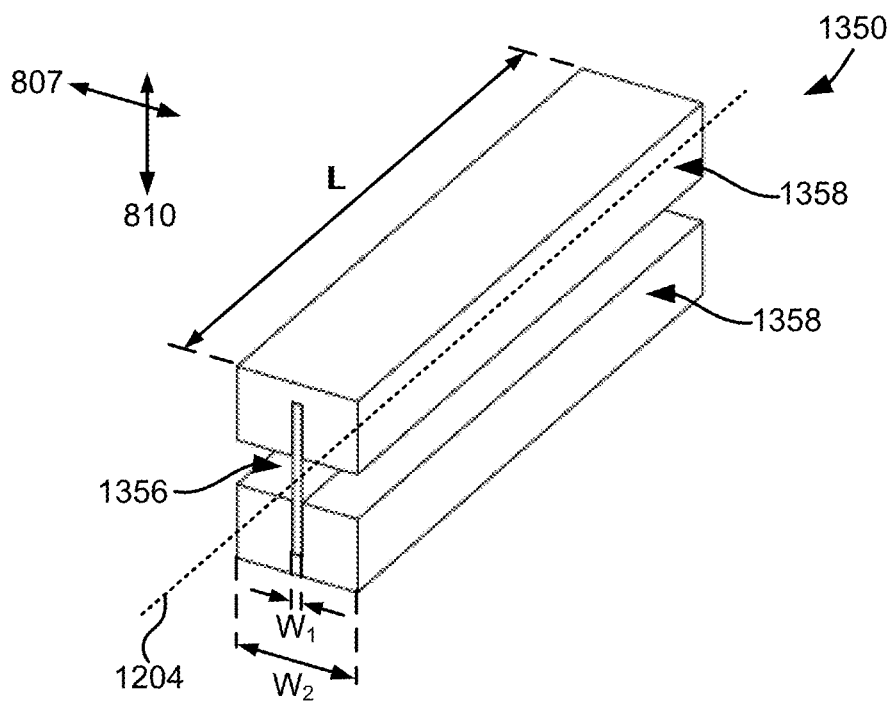
FIG. 13B is a partial perspective view of a flexure according to one embodiment.
Figure 14A:
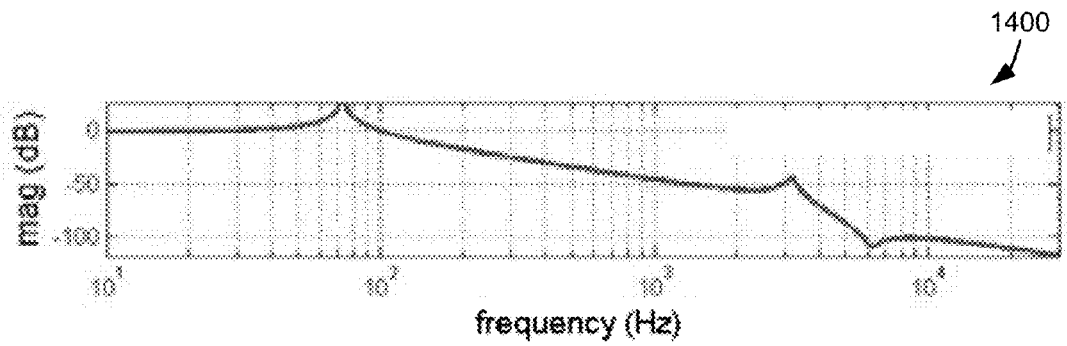
FIG. 14A is a graph of magnitude vs. frequency according to one embodiment.
Figure 14B:
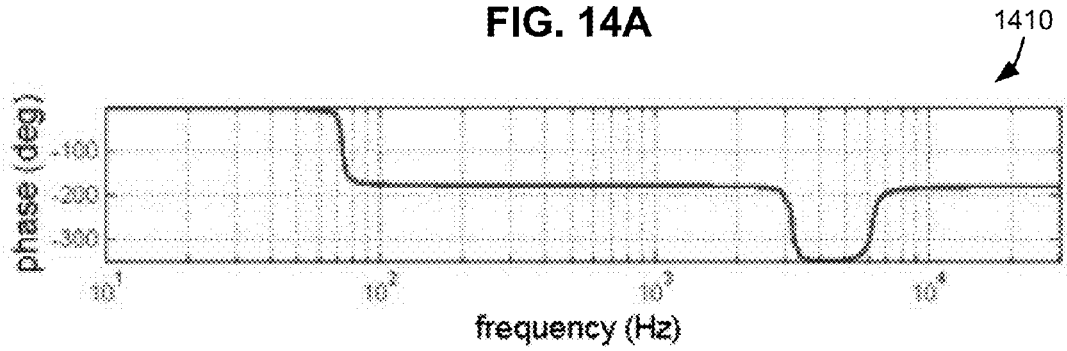
FIG. 14B is a graph of phase vs. frequency according to one embodiment.
Figure 14C:
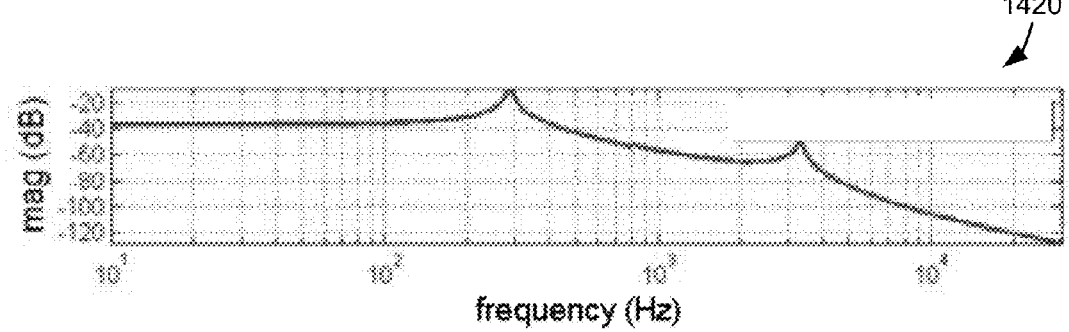
FIG. 14C is a graph of magnitude vs. frequency according to one embodiment.
Figure 14D:
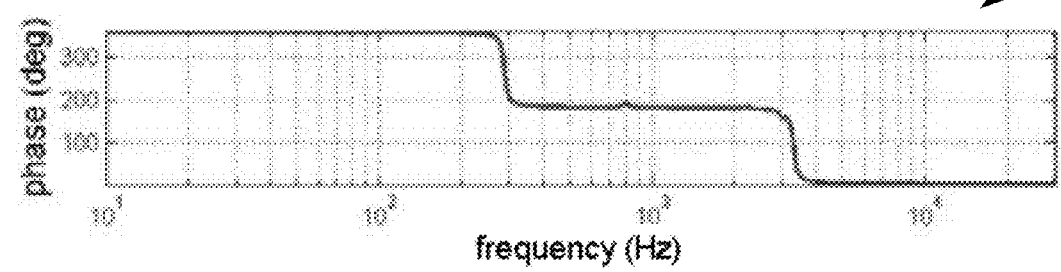
FIG. 14D is a graph of phase vs. frequency according to one embodiment.

Looking to FIGS. 13A-13B, flexures 1300, 1350 having different designs are illustrated in accordance with two embodiments. As an option, the present flexures 1300, 1350 may be implemented in conjunction with features from any other embodiment listed herein, such as those described with reference to the other FIGS., such as FIGS. 12A-12E. However, such flexures 1300, 1350 and others presented herein may be used in various applications and/or in permutations which may or may not be specifically described in the illustrative embodiments listed herein. Further, the flexures 1300, 1350 presented herein may be used in any desired environment. Thus FIGS. 13A-13B (and the other FIGS.) may be deemed to include any possible permutation.

Flexures 1300, 1350 include a pivot portion 1306, 1356 positioned between main beams 1308, 1358 respectively. The dimensions of the flexures 1300, 1350 are preferably such that a neck width $W_1$ of the pivot portions 1306, 1356 is smaller than a width $W_2$ of each of the main beams 1308, 1358 respectively. Having a narrow neck width $W_1$ of the pivot portion kinematically results in a rotation only type of constraint. Thus, the dimensional characteristics of flexures 1300, 1350 may limit the deformation thereof to only about an axis traveling through the center of the pivot portions 1306, 1356, and extending along the length L of the flexures 1300, 1350. It follows that deformation of the flexures 1300, 1350 in other degrees of motion, e.g., such as bending of the flexures along their length L, are constrained and motion in the pitch direction of a head attached thereto may desirably be prevented. Moreover, the length L of the flexures 1300, 1350 themselves may also prevent the undesirable pitching motion. Thus, in some approaches it is desirable that the length L of the flexure 1300, 1350 is much larger in comparison to the other dimensions (e.g., neck width $W_1$, main beam width $W_2$, etc.) of the flexures 1300, 1350. Preferably, the length L of the flexure 1300, 1350 is in the range of about 100 to about 500 times the neck width $W_1$, but may be higher or lower depending on the desired embodiment.

The circular cutouts of flexure 1300 in FIG. 13A may be achieved by creating (e.g., machining) two circular notches into a monolithic block of material. Thus, in some approaches the flexure 1300 may be a single piece of material. Other approaches may include forming a material in the desired shape e.g., by molding, stamping, etc.

Although the cutouts of flexure 1300 are shown as being circular, they are in no way limited thereto. For example, the cutouts defining the pivot portion 1306 between the main beams 1308 may be oval-shaped, angled, curved, tapered (e.g., such that the pivot portion becomes gradually wider as it approaches each of the main beams), etc., depending on the desired embodiment.

According to an exemplary embodiment, which is in no way intended to limit the invention, dimensions which resulting in a suitable hinge stiffness for a flexure 1300 as shown in FIG. 13A (e.g., having circular notches defining the pivot portion 1306), and made of spring steel, may include: a neck width $W_1$ of about 0.1 mm, a radius R of about 0.75 mm for the circular notch, and an overall length L of about 12 mm. However, depending on the desired flexure properties, materials used, etc., the preferred dimensions may vary.

Although monolithic flexures having a pivot portion formed by circular notches as shown in FIG. 13A is preferred, other variations may be used. For example, the flexure 1350 of FIG. 13B includes a pivot portion 1356 coupled to two main beams 1358. The pivot portion 1356 is shown as having an about constant neck width $W_1$. According to some approaches, the pivot portion 1356 may include a resiliently deformable material, e.g., such that the pivot portion 1356 is capable of withstanding prolonged, repetitive motion while maintaining structural integrity. Moreover, the pivot portion 1356 is shown as being coupled to the main beams 1358 using a groove in each of the main beams 1358. However, it should be noted that the pivot portion 1356 may be coupled to the main beams 1358 using bolts, screws, tongue and groove joints, clips, bonding, adhesives, clamps, spot welding, soldering, known coupling components and/or processes, etc., or any other process which provides a sufficiently rigid and durable bond, depending on the desired embodiment. Alternatively the pivot portion 1356 may be extruded from the flexure 1350 as a single monolithic part, e.g., as seen in FIG. 13A.

Moreover, although the flexures implemented in embodiments having only one flexure (e.g., see FIGS. 12A-12D) may include different designs, it is preferred that a pivot portion (as described above) has a smaller neck width $W_1$ than a width $W_2$ of each of the main beams as seen in FIGS. 13A-13B.

FIGS. 14A-14D include graphs 1400, 1410, 1420, 1430 which illustrate Bode plots of the dynamic transfer functions resulting from simulations of the above embodiments implementing a single flexure as presented in FIGS. 12A-13B. The plots shown in graphs 1400, 1410 correspond to simulations using actuated track-following, e.g., which involves motion of the head in the fine motion direction, guided by the horizontal flexures. Moreover, the plots shown in graphs 1420, 1430 correspond to simulations in which rotational head movement was enacted. Upon examining the graphs 1400, 1410, 1420, 1430, it may be determined that they indicate the principal deviation from an ideal dynamic behavior occurs at a frequency above about 3 kHz for both fine motion (graphs 1400, 1410) and rotational motion (graphs 1420, 1430). As described above with reference to FIGS. 11A-11D, the results achieved by implementing flexures as disclosed herein produce adequately high bandwidth for apparatuses such as tape drive actuator systems. Moreover, implementing the flexures results in substantial improvement to the track-follow performance compared to that of conventional designs.

It follows that the embodiments illustrated in FIGS. 12A-13B are able to achieve similar and/or the same functionality (e.g., enabling a pivot motion of an actuator assembly) as achieved using the embodiment disclosed above with reference to FIGS. 8A-10B. It should also be noted that the embodiment illustrated in FIGS. 12A-12C utilizes flexural components to obtain the rotational motion of the head carriage assembly, thereby enabling a guiding functionality while additionally achieving comparable performance improvements over conventional products.

Again, by implementing flexures and/or anti-sway flexures as described in the various embodiments herein, the onset of pitching motion is only experienced at frequencies higher than achievable using conventional products. Thus, pitching motion has a reduced impact on the anticipated bandwidth of embodiments implementing flexures as described herein.

It follows that various embodiments described herein are desirably able to resist pitching motion of magnetic heads without inhibiting the skew motion of the heads by implementing flexures which are resilient in the in-plain direction of the flexures, yet having an extent of torsional freedom, thereby allowing for skew motion to occur. Moreover, the arrangement of flexures and/or anti-sway flexures as described in the various embodiments herein desirably allows for pivotable motion of actuator assemblies without experiencing fit and wear issues as encountered using conventional pin and bushing configurations. As a result, the various embodiments described herein will have a longer life and negligible wear issues compared to such conventional products. Further still, actuator assemblies implementing flexures and/or anti-sway flexures have the additional advantage of being lighter than the conventional pivot pin and bushing configurations, thereby improving the dynamic response of the overall assembly.

It should also be noted that although many of the embodiments herein are described in terms of magnetic tape, similar and/or the same results may be achieved by implementing flexures with actuators of different media and/or applications to achieve the reduction of pitching motion thereof. Thus, the various embodiments described herein are in no way limited to implementations which include magnetic tape.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a head carriage assembly;
   a flexure coupling the head carriage assembly to a linear assembly, the linear assembly being configured to move along a fine motion direction; and
   a motor coupled to the head carriage assembly for rotatably positioning the head carriage assembly about an axis of skew which extends perpendicular to a plane defined by an intended direction of media movement across the head carriage assembly and the fine motion direction, the fine motion direction being oriented perpendicular to the intended direction of media movement; and
   an anti-sway flexure coupled between the head carriage assembly and the linear assembly, the anti-sway flexure being configured to reduce motion of the head carriage assembly in the intended direction of media movement,
   the flexure permitting the rotatable positioning of the head carriage assembly about the axis of skew, the flexure resisting pitching movement of the head carriage assembly relative to the linear assembly.

2. The apparatus as recited in claim 1, wherein no pivot pin extends along the axis of skew.

3. The apparatus as recited in claim 1, wherein at least a second flexure extends between the head carriage assembly and the linear assembly, wherein the flexures are positioned towards outer extents of the head carriage assembly.

4. The apparatus as recited in claim 3, wherein the flexures are positioned symmetrically relative to one another about the axis of skew.

5. The apparatus as recited in claim 3, wherein at least third and fourth flexures are present, the third and fourth flexures extending between the head carriage assembly and the linear assembly, wherein the third and fourth flexures are positioned towards outer extents of the head carriage assembly.

6. The apparatus as recited in claim 1, wherein a mounting point of the flexure to the head carriage assembly is offset from a mounting point of the flexure to the linear assembly in the fine motion direction.

7. The apparatus as recited in claim 1, wherein the flexure has a rectangular cross section taken perpendicular to a longitudinal axis thereof, wherein a dimension of the cross section is longer in the fine motion direction than the intended direction of media movement.

8. The apparatus as recited in claim 1, wherein the flexure extends from the head carriage assembly to the linear assembly in a direction generally parallel to the axis of skew.

9. The apparatus as recited in claim 1, wherein the flexure has a generally L-shaped profile.

10. The apparatus as recited in claim 1, wherein the motor is an electromagnetic motor.

11. The apparatus as recited in claim 10, wherein a current applied to the electromagnetic motor induces a movement of the head carriage assembly about the axis of skew for positioning the head carriage assembly relative to the intended direction of media movement.

12. The apparatus as recited in claim 1, wherein the flexure is directly coupled to the head carriage assembly and the linear assembly, wherein the flexure is configured to resist the pitching movement by the direct coupling.

13. An apparatus as recited in claim 1, comprising:
a magnetic head mounted to the head carriage assembly;
a drive mechanism for passing a magnetic medium over the magnetic head; and
a controller electrically coupled to the motor.

14. An apparatus, comprising:
a head carriage assembly;
a flexure coupling the head carriage assembly to a linear assembly, the linear assembly being configured to move along a fine motion direction; and
a motor coupled to the head carriage assembly for rotatably positioning the head carriage assembly about an axis of skew which extends perpendicular to a plane defined by an intended direction of media movement across the head carriage assembly and the fine motion direction, the fine motion direction being oriented perpendicular to the intended direction of media movement;
the flexure permitting the rotatable positioning of the head carriage assembly about the axis of skew, the flexure resisting pitching movement of the head carriage assembly relative to the linear assembly,
wherein at least a second flexure extends between the head carriage assembly and the linear assembly, wherein the flexures are positioned towards outer extents of the head carriage assembly,
wherein the flexures are coupled to the head carriage assembly along a line traversing and oriented perpendicular to the axis of skew and about centered relative to a head receiving portion of the head carriage assembly.

15. An apparatus, comprising:
a head carriage assembly;
a flexure coupling the head carriage assembly to a linear assembly, the linear assembly being configured to move along a fine motion direction; and
a motor coupled to the head carriage assembly for rotatably positioning the head carriage assembly about an axis of skew which extends perpendicular to a plane defined by an intended direction of media movement across the head carriage assembly and the fine motion direction, the fine motion direction being oriented perpendicular to the intended direction of media movement;
the flexure permitting the rotatable positioning of the head carriage assembly about the axis of skew, the flexure resisting pitching movement of the head carriage assembly relative to the linear assembly,
wherein the flexure extends and bends along the axis of skew.

16. The apparatus as recited in claim 15, wherein the flexure is a single piece of material.

17. The apparatus as recited in claim 15, wherein the flexure has a pivot portion extending between main beams, the pivot portion having a smaller width than a width of each of the main beams.

18. The apparatus as recited in claim 17, wherein the pivot portion is tapered such that the pivot portion becomes wider as it approaches each of the main beams.

19. The apparatus as recited in claim 15, wherein the flexure is the sole component coupling the head carriage assembly to the linear assembly.

\* \* \* \* \*